(12) United States Patent
Khinvasara et al.

(10) Patent No.: US 10,700,991 B2
(45) Date of Patent: Jun. 30, 2020

(54) MULTI-CLUSTER RESOURCE MANAGEMENT

(71) Applicant: Nutanix, Inc., San Jose, CA (US)

(72) Inventors: Abhijit S. Khinvasara, Los Altos, CA (US); Karan Gupta, San Jose, CA (US); Ranjan Parthasarathy, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 16 days.

(21) Appl. No.: 16/200,525

(22) Filed: Nov. 26, 2018

(65) Prior Publication Data

US 2019/0342229 A1    Nov. 7, 2019

Related U.S. Application Data

(60) Provisional application No. 62/591,130, filed on Nov. 27, 2017, provisional application No. 62/591,126, filed on Nov. 27, 2017.

(51) Int. Cl.

| | |
|---|---|
| *G06F 15/173* | (2006.01) |
| *H04L 12/911* | (2013.01) |
| *H04L 12/717* | (2013.01) |
| *H04L 12/26* | (2006.01) |
| *G06F 9/455* | (2018.01) |
| *H04L 12/715* | (2013.01) |

(52) U.S. Cl.
CPC .......... *H04L 47/70* (2013.01); *G06F 9/45558* (2013.01); *H04L 43/0805* (2013.01); *H04L 45/42* (2013.01); *H04L 45/46* (2013.01); *G06F 2009/45579* (2013.01)

(58) Field of Classification Search
USPC ....... 709/203, 205, 206, 217, 219, 223, 224, 709/226, 228, 230, 232, 238
See application file for complete search history.

(56) References Cited

U.S. PATENT DOCUMENTS

| | | |
|---|---|---|
| 6,031,533 A | 2/2000 | Peddada et al. |
| 7,809,833 B2 | 10/2010 | Shen et al. |
| (Continued) | | |

OTHER PUBLICATIONS

Notice of Allowance dated Aug. 28, 2019 for related U.S. Appl. No. 15/006,416.

(Continued)

*Primary Examiner* — Quang N Nguyen
(74) *Attorney, Agent, or Firm* — Vista IP Law Group, LLP

(57) ABSTRACT

Entries in individual portions of a network map serve to establish inter-cluster routes that are formed from routing data structures at individual clusters, which routing data structures store connection parameters pertaining to access point nodes in a multi-cluster computing environment. Upon receiving a resource management request at one of the access points, the request parameters are used in combination with the network map to identify at least one target access point having a virtual machine for responding to the resource management request. The resource management request is routed to a next hop access point node on route(s) to target access points. If the next hop access point node is not the node to respond to the resource management request, then processing at the next hop node serves to route the resource management request to a further next hop access point node on a route to the target access point.

18 Claims, 15 Drawing Sheets

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,621,569 B1 | 12/2013 | Ewing |
| 8,634,330 B2 | 1/2014 | Ganapathy et al. |
| 8,671,176 B1 | 3/2014 | Kharitonov et al. |
| 8,850,130 B1 | 9/2014 | Aron et al. |
| 9,003,141 B2 | 4/2015 | Nielsen et al. |
| 9,178,284 B2 | 11/2015 | Liu et al. |
| 9,231,988 B2 | 1/2016 | Holt et al. |
| 9,239,820 B1 | 1/2016 | Marks et al. |
| 9,268,590 B2 | 2/2016 | Du et al. |
| 9,772,866 B1 | 9/2017 | Aron et al. |
| 2002/0054152 A1 | 5/2002 | Palaniappan et al. |
| 2002/0129136 A1 | 9/2002 | Matharu |
| 2003/0058277 A1 | 3/2003 | Bowman-Amuah |
| 2003/0110262 A1 | 6/2003 | Hasan et al. |
| 2005/0149501 A1 | 7/2005 | Barrett |
| 2006/0259592 A1 | 11/2006 | Angeline |
| 2007/0043550 A1 | 2/2007 | Tzruya |
| 2007/0106748 A1 | 5/2007 | Jakobsson et al. |
| 2008/0015823 A1 | 1/2008 | Arnold et al. |
| 2008/0040661 A1 | 2/2008 | Curtis et al. |
| 2008/0091800 A1 | 4/2008 | Sorrentino et al. |
| 2008/0177839 A1* | 7/2008 | Chang ............... G06Q 10/10 709/205 |
| 2009/0019436 A1 | 1/2009 | Hartz et al. |
| 2009/0077623 A1 | 3/2009 | Baum et al. |
| 2009/0150851 A1 | 6/2009 | Boer et al. |
| 2009/0241104 A1 | 9/2009 | Amiga et al. |
| 2009/0282333 A1 | 11/2009 | Olsen et al. |
| 2010/0077362 A1 | 3/2010 | Allred et al. |
| 2010/0269152 A1 | 10/2010 | Pahlavan et al. |
| 2011/0209047 A1 | 8/2011 | Olsen et al. |
| 2011/0252117 A1 | 10/2011 | Sng et al. |
| 2011/0277027 A1 | 11/2011 | Hayton et al. |
| 2012/0011509 A1 | 1/2012 | Husain |
| 2012/0047130 A1 | 2/2012 | Perez et al. |
| 2012/0054265 A1* | 3/2012 | Kazerani ............ H04L 43/0811 709/203 |
| 2012/0092277 A1 | 4/2012 | Momchilov |
| 2012/0117497 A1 | 5/2012 | Uola et al. |
| 2013/0117359 A1 | 5/2013 | Husain et al. |
| 2014/0020083 A1* | 1/2014 | Fetik ................... G06F 21/552 726/11 |
| 2014/0214922 A1 | 7/2014 | Kim et al. |
| 2014/0304407 A1* | 10/2014 | Moon .................. H04L 43/045 709/224 |
| 2015/0082179 A1 | 3/2015 | Ayanam et al. |
| 2015/0113528 A1 | 4/2015 | Kim et al. |
| 2015/0121369 A1 | 4/2015 | Thankappan et al. |
| 2015/0163206 A1 | 6/2015 | Mccarthy et al. |
| 2015/0256475 A1* | 9/2015 | Suman .................. H04L 47/70 709/226 |
| 2015/0295992 A1 | 10/2015 | Kruglick |
| 2015/0297776 A1 | 10/2015 | Conroy et al. |
| 2015/0363190 A1 | 12/2015 | Bhatia et al. |
| 2016/0261564 A1* | 9/2016 | Foxhoven ............. H04L 63/10 |
| 2016/0337426 A1* | 11/2016 | Shribman ........... H04L 65/4084 |
| 2016/0359680 A1* | 12/2016 | Parandehgheibi .... G06F 16/235 |
| 2017/0208138 A1 | 7/2017 | Baxter |
| 2017/0235817 A1 | 8/2017 | Deodhar et al. |
| 2019/0349254 A1* | 11/2019 | Nolan .................. H04L 41/12 |
| 2019/0349426 A1* | 11/2019 | Smith .................. H04W 4/08 |

OTHER PUBLICATIONS

Cano, I. et al., "Curator: Self-Managing Storage for Enterprise Clusters", 14th USENIX Symposium on Networked Systems Design and Implementation, NSDI '17, (Mar. 27, 2017).

Final Office Action dated May 2, 2019 for related U.S. Appl. No. 15/006,416, 12 pages.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Non-Final Office Action dated Apr. 3, 2018 for related U.S. Appl. No. 15/006,435.

"IBM Tivoli Storage Manager for Linux", published on Apr. 2003, [online] http://publib.boulder.ibm.com/tividd/td/ITSML/GC23-4691-01/en_US/HTML/anrlrf51225.htm (Year: 2003), 17 pages.

Russ "Efficient caching of versioned JavaScript, CSS and image assets for fun and profit", published on May 18, 2009, https://webarchive.org/web/20120518020237/http://2tap.com/2009/05/08/efficient-caching-of-versioned-javascript-css-and-image-assets-for-fun-and-profit/ (Year: 2009), 6 pages.

Wikipedia, "OAuth", Nov. 12, 2017, 8 pages.

Non-Final Office Action dated Oct. 4, 2018 for related U.S. Appl. No. 15/006,416, 11 pages.

Final Office Action dated Oct. 18, 2018 for related U.S. Appl. No. 15/006,435, 16 pages.

U.S. Appl. No. 15/826,658, filed Nov. 29, 2017, 68 pages.

Notice of Allowance dated Apr. 22, 2020 for related U.S. Appl. No. 15/006,435.

\* cited by examiner

MULTI-CLUSTER RESOURCE MANAGEMENT

RELATED APPLICATIONS

The present application claims the benefit of priority to U.S. Patent Application Ser. No. 62/591,130 titled "MULTI-CLUSTER RESOURCE MANAGEMENT", filed on Nov. 27, 2017; and this application claims the benefit of priority to U.S. Patent Application Ser. No. 62/591,126 titled "FORMING NETWORKS OF CONNECTION MANAGEMENT AGENTS", filed on Nov. 27, 2017, both of which are hereby incorporated by reference in their entirety.

FIELD

This disclosure relates to management of resources in multi-cluster computing environments, and more particularly to techniques for managing virtual machines in a multi-cluster deployment.

BACKGROUND

Sets of computing resources in a distributed computing system are often grouped into resource subsystems. The resource subsystems are often defined by physical and/or logical boundaries such as nodes, clusters, regions, sites, data centers, or other management areas. For example, one resource subsystem might comprise a logically bounded set of nodes associated with a certain department of an enterprise, while another resource subsystem might be associated with a particular physical property (e.g., site, data center) or geographical location (e.g., region). Modern computing systems might be composed of many physically- or logically-bounded resource subsystems that comprise many nodes (or more) that in turn support as many as several thousand (or more) autonomous virtualized entities (VEs). The VEs that are deployed in distributed systems might be virtual machines (VMs) and/or executable containers in any blend or combination.

Furthermore, scaling in these modern computing systems has evolved to include scaling by increasing the number of clusters that are deployed into existing and/or new sites and/or regions. For example, multiple clusters associated with multiple respective resource owners (e.g., enterprises) might be deployed into a certain physical data center located at a particular site. As another example, multiple clusters from a single resource owner might be deployed into a certain logical availability zone. Multiple availability zones might in turn be logically organized into a computing region (e.g., US-West). In still other cases, various computing clusters might be available through the Internet as private and/or public cloud resources. In any of these examples or cases, the set of computing clusters that might be configured to communicate with any other cluster or clusters can by highly dynamic.

Unfortunately, management of the numerous resources distributed across or between computing clusters in a multi-cluster configuration can present challenges. For example, a resource owner might desire to manage (e.g., create, update, delete, monitor, etc.) a set of inter- or intra-cluster resources from a single centralized access point (e.g., resource management portal, multi-region access point).

One approach to providing resource management functionality at the centralized access point is to replicate the entity data describing the resources at the centralized access point. However, replication of data for large numbers and/or large volumes of resources can consume significant storage resources. Further, since the centralized access point covers multiple logical levels (e.g., a regional level, an availability zone level, a cluster level), any of which levels might be logically or geographically remote from the underlying resources, the replication of the entity data can consume significant storage I/O resources and/or network I/O resources at any or all of these levels. In the case of certain entity modification operations (e.g., create, update, delete, etc.), the foregoing approaches replicate large amounts of entity data, thus consuming more and more resources as time goes on. What is needed is a technological solution for efficiently managing resources from a centralized access point in a highly dynamic multi-cluster computing environment, yet without replicating large amounts of entity data.

SUMMARY

The present disclosure provides a detailed description of techniques used in systems, methods, and in computer program products for multi-cluster resource management, which techniques advance the relevant technologies to address technological issues with legacy approaches. More specifically, the present disclosure provides a detailed description of techniques used in systems, methods, and in computer program products that implement a communication and processing regime that uses a virtual access point network map to route resource management requests between computing clusters.

The disclosed embodiments modify and improve over legacy approaches. In particular, the herein-disclosed techniques provide technical solutions that address the technical problems attendant to efficiently managing resources from a centralized access point in a highly dynamic multi-cluster computing environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing cluster management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
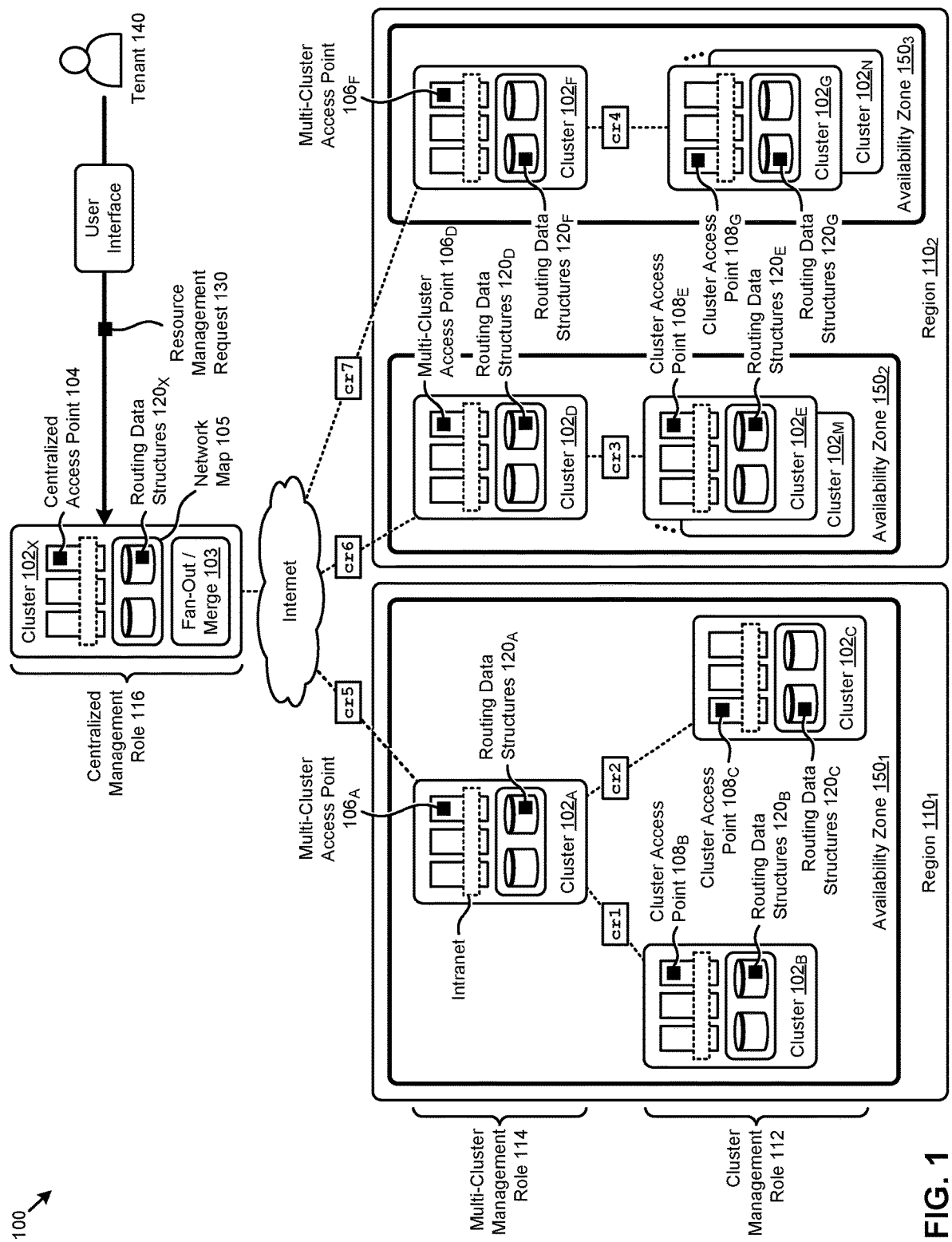
FIG. 1 illustrates a multi-cluster computing environment in which embodiments of the present disclosure can be implemented.

Embodiments in accordance with the present disclosure address the problem of efficiently managing resources from a centralized access point in a highly dynamic multi-cluster computing environment. Some embodiments are directed to approaches for implementing a communication and processing regime to route resource management requests through a network of computing cluster access points that are determined through use of an access point network map. The accompanying figures and discussions herein present example environments, systems, methods, and computer program products for management of resources in multi-cluster computing environments.

Overview

Disclosed herein are techniques for implementing a communication and processing regime to route resource management requests through a network of computing cluster access points in a multi-cluster computing environment. In the example embodiments, a set of access points in the multi-cluster computing environment and a network map of inter-cluster connections interconnecting the access points are identified. A resource management request is received at a centralized access point (e.g., resource management portal, multi-region access point) that is identified from the access points. The centralized access point applies one or more request parameters from the resource management request to a set of routing data structures to identify a target access point to carry out the request. The network map of inter-cluster connections is used to route the request to the identified target access point. The target access point processes the request and/or forwards it to another target access point using local instances of the routing data structures.

In certain embodiments, virtual entity resource management in a multi-cluster environment can be accomplished by routing and forwarding the request over many levels of resource subsystems in the multi-cluster computing environment. The routing and forwarding is facilitated by using the routing data structures that form the network map of inter-cluster connections. In certain embodiments, more than one target access point can be selected. In certain embodiments, the target access point is selected based in part on availability, capability, loading, and/or other attributes. In certain embodiments, data in the routing data structures can be synchronized over multiple instances of the routing data structures in the multi-cluster computing environment. In certain embodiments, the routing data structures can facilitate mapping of a tenant identifier to a logical availability zone, and/or mapping of a logical availability zone to a physical availability zone.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a multi-cluster computing environment 100 in which embodiments of the present disclosure can be implemented. As an option, one or more variations of multi-cluster computing environment 100 or any aspect thereof may be implemented in the context of the architecture and functionality of the embodiments described herein. The multi-cluster computing environment 100 or any aspect thereof may be implemented in any environment.

The multi-cluster computing environment 100 shown in FIG. 1 is a multi-cluster computing environment comprising various representative clusters. As can be observed, multiple clusters can be associated in resource subsystems in accordance with physical and/or logical boundaries. Specifically, for example, a cluster $102_A$, a cluster $102_B$, and a cluster $102_C$ comprise a resource subsystem identified as availability zone $150_1$. Further, a cluster $102_D$ and a cluster $102_E$ through a cluster $102_M$ are within an availability zone $150_2$. Also, a cluster $102_F$ and a cluster $102_G$ through a cluster $102_N$ are in availability zone $150_3$. As shown, one or more availability zones can be grouped in a region. Specifically, region $110_1$ comprises availability zone $150_1$, and region $110_2$ comprises availability zone $150_2$ and availability zone $150_3$.

A particular cluster might also fully comprise a resource subsystem as depicted in FIG. 1 by a cluster $102_X$. Availability zones are often logically isolated from one another, at least as pertains to certain failure events, so as to facilitate availability of resources when failures occur. For example, if a particular resource (e.g., VM, container, etc.) is replicated over multiple availability zones, and a failure occurs at one of the availability zones, the resource can be accessed at another availability zone. Regions are also often isolated from one another to facilitate another layer of fault tolerance and/or security. In some cases, resources are not replicated automatically across regions. Also, in some cases, tenants (e.g., tenant 140) might have access privileges for a certain specified region.

In some systems or environments (e.g., multi-cluster computing environment 100), an access point is implemented at certain clusters. As used herein, an access point is a set of resources (e.g., a virtual machines and their respective virtual entities) in a cluster selected to facilitate various intra-cluster and/or inter-cluster operations. In some cases, the access points serve various roles. For example, some access points (e.g., cluster access point $108_B$, cluster access point $108_C$, cluster access point $108_E$, and cluster access point $108_G$) serve a cluster management role 112, for which a primary objective might be to manage the resources of a single cluster. As another example, certain access points (e.g., multi-cluster access point $106_A$, multi-cluster access point $106_D$, and multi-cluster access point $106_F$) serve a multi-cluster management role 114, for which a primary objective might be to manage multiple clusters in a particular resource subsystem (e.g., availability zone). Further, other access points (e.g., centralized access point 104) serve a centralized management role 116, for which a primary objective might be to manage multiple clusters across multiple availability zones and/or regions.

In some cases, the roles can form hierarchical tiers. For example, the access point(s) in the centralized management role 116 might be hierarchically superior to the access point(s) in the multi-cluster management role 114, and the access point(s) in the multi-cluster management role 114 might be hierarchically superior to the access point(s) in the cluster management role 112. In any case, an access point can comprise a user interface that a user (e.g., tenant 140) can interact with to manage certain aspects (e.g., topology, operation, performance, etc.) of the corresponding cluster. Further, the access point can manage the allocation, scheduling, workloads, and performance of the resources in a corresponding cluster. Specifically, according to certain embodiments, a network of connection resources interconnecting the access points facilitate an implementation of a communication and processing regime to route resource management requests over multiple resource subsystems (e.g., availability zone $150_1$, availability zone $150_2$, availability zone $150_3$, region $110_1$, region $110_2$, etc.) in the multi-cluster computing environment 100.

More specifically, and as shown, multi-cluster access point $106_A$ at cluster $102_A$ can establish a connection with cluster access point $108_B$ at cluster $102_B$. Certain attributes characterizing the connection as a connection resource (e.g., "cr1") can be stored locally in a set of routing data structures $120_B$. For example, a connection identifier "cr1", a set of shared authentication tokens, and/or other connection attributes can be stored in the routing data structures $120_B$. As can be observed, other connection resources (e.g., "cr2", "cr3", "cr4", "cr5", "cr6", and "cr7") and corresponding instances of routing data structures (e.g., routing data structures $120_A$, routing data structures $120_C$, routing data structures $120_D$, routing data structures $120_E$, routing data structures $120_F$, routing data structures $120_G$, and routing data structures $120_X$) can be established between the access point node pairs of multi-cluster computing environment 100.

In some cases, the connection resources might be established over an intranet (e.g., in an "on-premises" resource subsystem) while, in other cases, the connection resources might be established over the Internet (e.g., with a cloud-based access point and/or cluster). As used herein, a connection resource is a network connection such as an HTTP socket or a WebSocket. As used herein, a connection resource refers to a previously-established network connection between access point nodes.

The collection of the connection resources (e.g., "cr1" through "cr7") forms a network of connection resources pertaining to the multi-cluster computing environment 100. This collection of connection resources, and the availability of a network map 105 facilitates routing of a request (e.g., a resource management request) from any one access point in a multi-cluster computing environment 100 to any other point or points in the multi-cluster computing environment 100.

As used herein a resource management request is a message that includes a particular action to be performed as pertains to a particular computing entity (e.g., a virtual machine or other virtual entity, a hardware component, etc.). In some cases, the action of a resource management request is a READ-ONLY operation that merely accesses the referenced computing entity (e.g., to retrieve a parameter value). In other cases, the action of a resource management request is a MODIFY operation that updates the referenced computing entity (e.g., to change a parameter value). In still other cases, the action of a resource management request is a CREATE operation or ALLOCATE operation that creates or allocates a referenced computing entity. A resource management request can originate from any point in the multi-cluster computing environment and can be directed to any other point in the multi-cluster computing environment. The route is determined at least in part by consulting the network map 105.

As such, a request that originates at, for example, the centralized access point 104 can be routed to or through other access points to reach a destination. In some cases, a request can have multiple target destinations (e.g., multiple target access points), at which access points the request can be received and processed. As such, the topology of the shown multi-cluster computing environment 100 supports a one-request to multiple target processing model (e.g., using one-to-many routing). The shown fan-out/merge logic 103 supports routing of any request from a cluster to any one or more clusters (e.g., to the access point or points corresponding to target clusters). When the one or more target clusters complete their processing, any results of the processing and/or any status from performance of the processing can be returned (e.g., routed back) to the requesting access point through a cluster-specific instance of fan-out/merge logic 103. As pertaining to the example of FIG. 1, a request is routed to/through two clusters using the fan-out function of the shown fan-out/merge logic 103, and results are returned using the merge function of the shown fan-out/merge logic 103.

Continuing the example of FIG. 1, a resource management request 130 issued by tenant 140 through a user interface is received at centralized access point 104. The request is processed at centralized access point 104 to determine that the request is to be routed to availability zone $150_3$. For example, certain request parameters might be applied to various data in the routing data structures $120_X$ to identify the availability zone $150_3$. The access point (e.g., multi-cluster access point $106_F$) for availability zone $150_3$ is then determined, and the associated connection resource "cr7" is used to route the request to availability zone $150_3$. The request is received at multi-cluster access point $106_F$ and is scheduled for processing at cluster access point $108_G$ at cluster $102_G$ using connection resource "cr4". For example, cluster access point $108_G$ might selected by multi-cluster access point $106_F$ based in part on the request parameters, resource usage measurements, and/or other characteristics.

In some cases, the routing of a resource management request to one or more resources in a multi-cluster computing environment can be referred to as a "fan-out" of the request. One embodiment of such fan-out operations as facilitated by the herein disclosed techniques is shown and described as pertains to FIG. 2.

Figure 2:
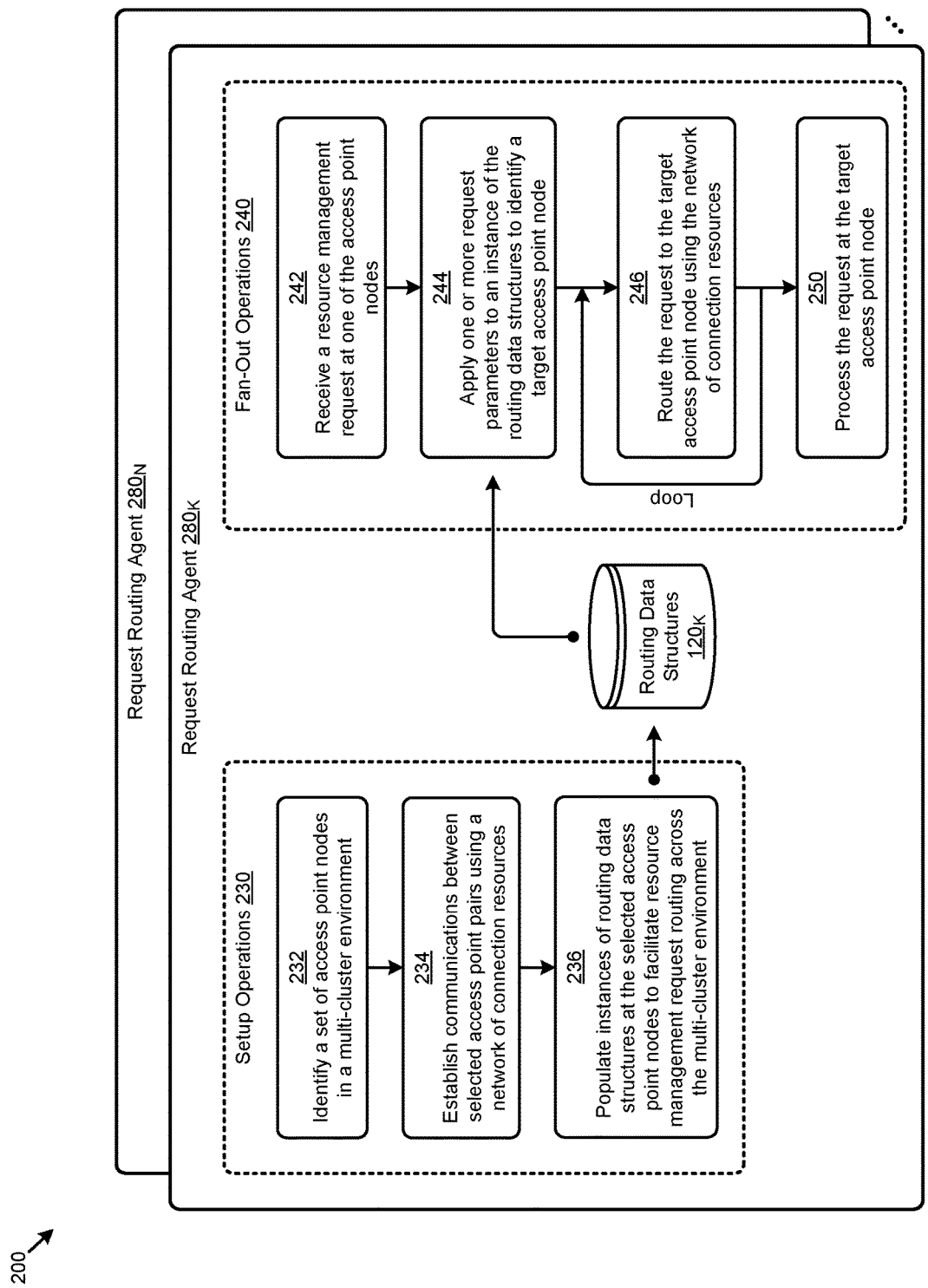
FIG. 2 depicts a resource management request fan-out technique as implemented in systems that facilitate management of resources in multi-cluster computing environments, according to some embodiments.

FIG. 2 depicts a resource management request fan-out technique 200 as implemented in systems that facilitate management of resources in multi-cluster computing environments. As an option, one or more variations of resource management request fan-out technique 200 or any aspect thereof may be implemented in the context of the architecture and functionality of the embodiments described herein. The resource management request fan-out technique 200 or any aspect thereof may be implemented in any environment.

The resource management request fan-out technique 200 presents one embodiment of certain steps and/or operations that facilitate management of resources in multi-cluster computing environments. As shown, the steps and/or operations can be grouped in a set of setup operations 230 (e.g., connection resource and routing data structure setup operations) and a set of fan-out operations 240 (e.g., resource management request routing operations). In certain embodiments, these operations can be performed by instances of a request routing agent (e.g., request routing agent $280_K$, . . . , request routing agent $280_N$). For example, instances of a request routing agent might operate at each node in a cluster or at a selected node (e.g., leader node) in the cluster.

As illustrated, the setup operations 230 of the resource management request fan-out technique 200 can commence by identifying a set of access point nodes in a multi-cluster computing environment (step 232). As an example, a list of access point nodes and associated attributes (e.g., unique identifiers, URLs, status, etc.) might published to a registry that is accessible by the clusters in the environment. A network of connection resources that interconnect a selected set of access point pairs is then established (step 234). For example, a connection resource at a given access point pair can be established by invoking a protocol (e.g., Websocket protocol) that establishes a persistent connection between the access points of the pair.

Further details regarding general approaches to establishing a connection resource between clusters are described in U.S. Provisional Application No. 62/591,126, titled "FORMING NETWORKS OF CONNECTION MANAGEMENT AGENTS", filed on Nov. 27, 2017, which is hereby incorporated by reference in its entirety.

Two or more instances of routing data structures at the selected access points (e.g., of the access point pairs) are populated with information to facilitate resource management request routing (e.g., fan-out) across the multi-cluster computing environment (step 236). As illustrated, routing data structures $120_K$ is one example of the routing data structures that are accessible, for example, by the access point running the request routing agent $280_K$. As described herein, the routing data structures are specialized data structures that facilitate, in part, the routing of resource management requests by organizing and storing data that characterizes the network of connection resources, various intra-cluster and inter-cluster mapping relationships, various resource (e.g., entity) information, and/or other information.

The fan-out operations 240 shown in FIG. 2 can commence by receiving a resource management request at one of the access point nodes (e.g., a centralized access point) in the multi-cluster computing environment (step 242). One or more request parameters derived from the resource management request are applied to a local instance of the routing data structures (e.g., routing data structures $120_K$) to identify a target access point node (step 244). For example, a logical availability zone name included in the request can be mapped to a physical availability zone using the information in the routing data structures, which physical availability zone can, in turn, be mapped to an access point node (e.g., the target access point node) associated with the physical availability zone using the information in the routing data structures.

The request can then be routed to the target access point node using the network of connection resources (step 246). In some cases, the request received at the target access point node might be forwarded to another access point node in the multi-cluster computing environment. As such, the fan-out operations (e.g., step 242, step 244, and step 246) are repeated at the then-current recipient of the resource management request (e.g., the then-current target access point node). In some cases, certain requests are forwarded or routed to a resource subsystem (e.g., a cluster at a particular tier in a hierarchy) of the multi-cluster computing environment in accordance with the request type and/or other parameters. The herein disclosed techniques can facilitate forwarding and/or routing over any number of resource subsystems. When the request has reached a then-current target access point node (e.g., at a particular resource subsystem) that can process the request, the request is processed (step 250).

Figure 3A:
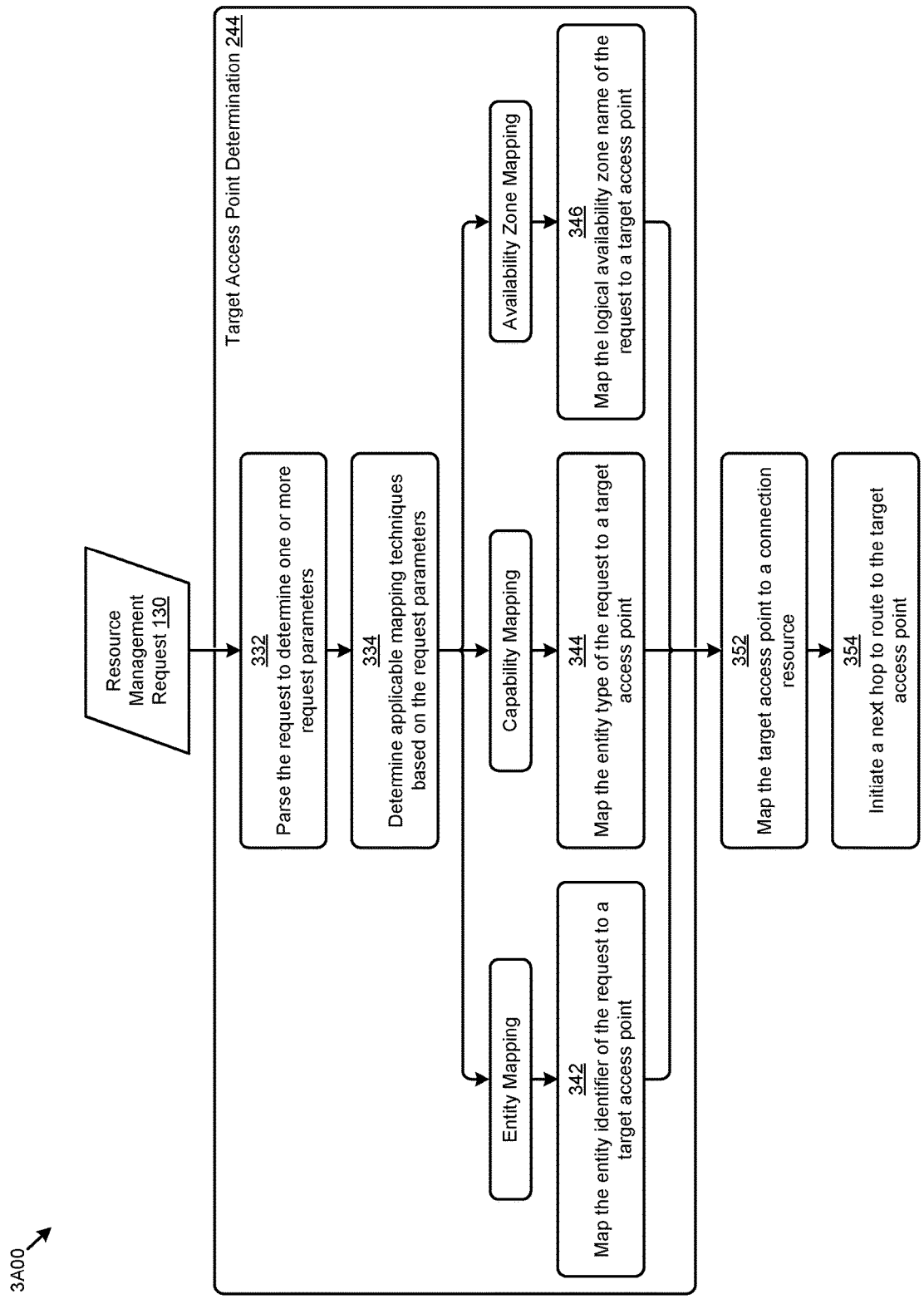
FIG. 3A presents a target access point identification technique as implemented in systems that facilitate management of resources in multi-cluster computing environments, according to some embodiments.

Further details pertaining to identifying a target access point based at least in part on the request parameters (e.g., step 244 of FIG. 2) is presented and discussed as pertains to FIG. 3A.

FIG. 3A presents a target access point identification technique 3A00 as implemented in systems that facilitate management of resources in multi-cluster computing environments. As an option, one or more variations of target access point identification technique 3A00 or any aspect thereof may be implemented in the context of the architecture and functionality of the embodiments described herein. The target access point identification technique 3A00 or any aspect thereof may be implemented in any environment.

The target access point identification technique 3A00 presents one embodiment of certain steps and/or operations that facilitate identification of target access points based at least in part on received resource management requests. As can be observed, target access point identification technique 3A00 can commence by parsing (step 332) a received resource management request (e.g., resource management request 130 of FIG. 1). The request parameters are applied to one or more mapping techniques to determine applicable mapping techniques (step 334). In the embodiment shown in FIG. 3A, techniques pertaining to an "entity mapping", a "capability mapping", and an "availability zone mapping" are presented. Other mapping techniques are possible. These mapping techniques are facilitated at least in part by certain specialized data structures (such as those shown and described as pertains to FIG. 3B).

According to the target access point identification technique 3A00, an entity mapping technique maps an entity identifier included as a parameter in the resource management request to a target access point (step 342). In this case, a target entity might be known at the time the request is issued such that a target access point associated with the entity can be identified. The shown capability mapping technique maps an entity type from the request to a target access point (step 344). As an example, the request might pertain to an operation that is executed on a certain type of entity (e.g., a storage-only node). A target access point that has access to such an entity might then be identified.

The shown availability zone mapping maps a logical availability zone name (e.g., "SF" for San Francisco) to a target access point (step 346). Such availability zone mapping often comprises a first mapping of a logical availability zone name to a physical availability zone identifier, and then mapping the physical availability zone identifier to some identifier (e.g., cluster identifier) associated with the target access point. When the target access point is identified, the target access point is in turn mapped to a connection resource for accessing the target access point (step 352). When the target access point has been determined, the mapped-to connection resource is used for routing to the next hop on the way to the target access point (step 354).

Figure 3B:
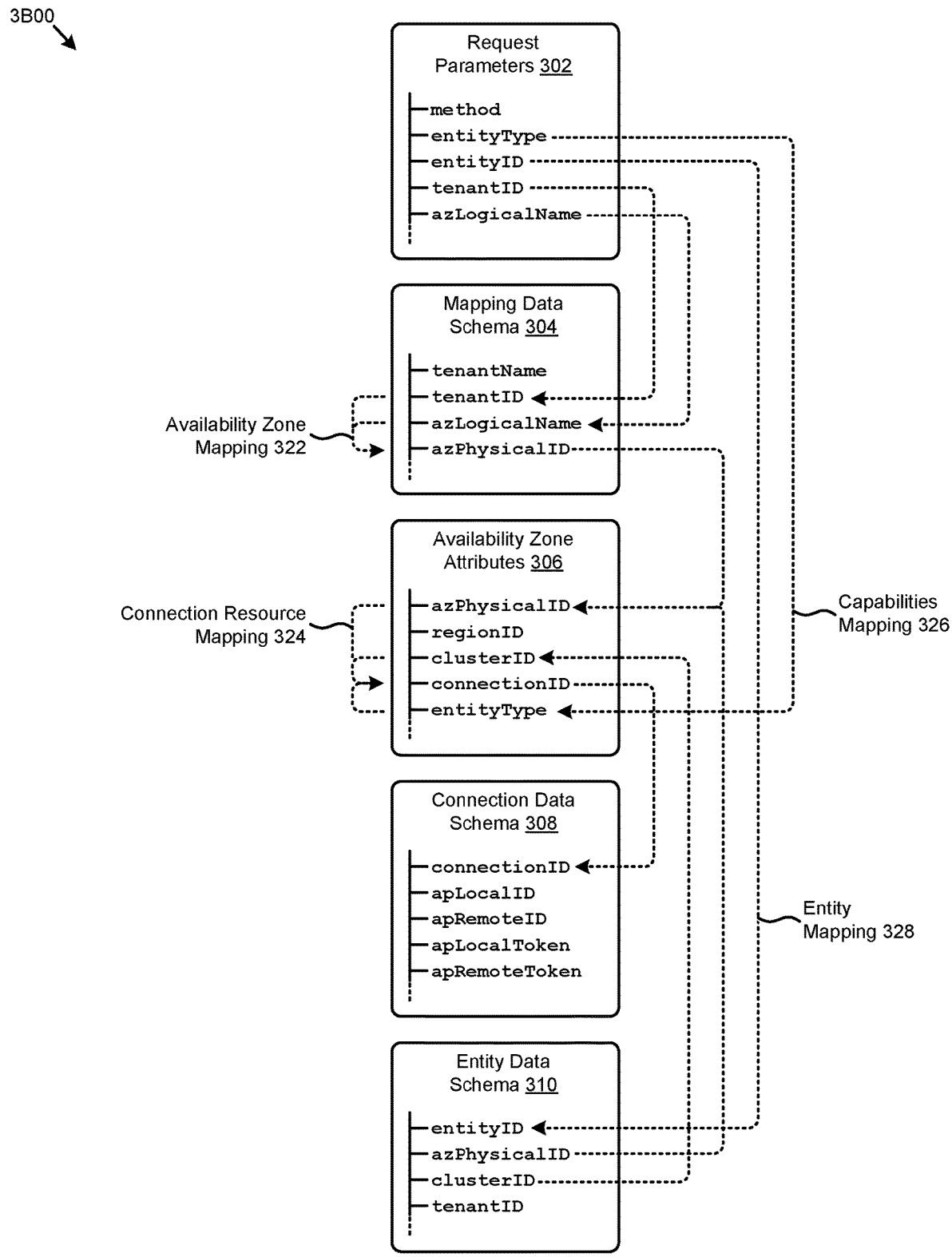
FIG. 3B is a diagrammatic representation of data structures used for managing resources in multi-cluster computing environments, according to an embodiment.

A detailed embodiment of the data structures (e.g., routing data structures) described herein is presented and discussed as pertains to FIG. 3B.

FIG. 3B is a diagrammatic representation of data structures 3B00 used for managing resources in multi-cluster computing environments. As an option, one or more variations of data structures 3B00 or any aspect thereof may be implemented in the context of the architecture and functionality of the embodiments described herein. The data structures 3B00 or any aspect thereof may be implemented in any environment.

The data structures shown in FIG. 3B present certain specialized data structures (e.g., routing data structures) that are designed to improve the way a computer stores and retrieves data in memory when performing the herein disclosed techniques. A set of representative relationships (e.g., mappings) between the data structures are also shown. Specifically, request parameters 302 represents a set of parameters that might be included in and/or derived from a resource management request issued to one or more access points in a multi-cluster computing environment. As can be observed, request parameters 302 can include a request method (e.g., HTTP "POST", "PUT", or "GET" assigned to a "method" parameter), an entity type (e.g., "vm" or "project" entity assigned to an "entityType" parameter), an entity identifier (e.g., a virtual machine identifier assigned to an "entityID" parameter), a tenant identifier (e.g., "07" assigned to a "tenantID" parameter), an availability zone logical name (e.g., "SF" or "NY" assigned to an "azLogicalName" parameter), and/or other parameters.

A set of mapping data can also be organized and/or stored in data structures 3B00 (e.g., routing data structures). Such mapping data might be organized and/or stored as entity objects, data tables, and/or other structures. When organized and/or stored in a tabular structure (e.g., relational database table), the mapping data might have entries (e.g., rows) that relate to various attributes pertaining to routing and/or processing resource management requests. For example, and as depicted in mapping data schema 304, a table entry might describe a tenant name (e.g., stored in an "tenantName" field), a tenant identifier (e.g., "07" stored in a "tenantID" field), an availability zone logical name (e.g., "SF" or "NY" stored in an "azLogicalName" field), an availability zone physical identifier (e.g., "azo3" stored in an "azPhysicalID" field), and/or other mapping attributes.

Details pertaining to the availability zones can also be organized and/or stored in data structures 3B00 (e.g., routing data structures). Specifically, availability zone attributes 306 represents a set of attributes that might describe a particular availability zone and/or corresponding components (e.g., clusters, connection resources, entities, etc.) of the availability zone. As can be observed, availability zone attributes 306 can include an availability zone physical identifier for a particular availability zone (e.g., "az03" assigned to an "azPhysicalID" attribute), a region identifier associated with the availability zone (e.g., assigned to a "regionID" attribute), a cluster identifier for a cluster in the availability zone (e.g., assigned to a "clusterID" attribute), a connection resource identifier for the access point of the availability zone (e.g., "cr1" or "cr5" assigned to a "connectionID" attribute), an entity identifier for an entity in the availability zone (e.g., "vm047" assigned to an "entityID" attribute), and/or other attributes.

Further, a set of connection data can be organized and/or stored in data structures 3B00 (e.g., routing data structures). Such connection data might be organized and/or stored as entity objects, data tables, and/or other structures. When organized and/or stored in a tabular structure (e.g., relational database table), the connection data might have entries (e.g., rows) that describe various attributes pertaining to a particular connection resource that connects a local access point to a remote access point. For example, and as depicted in connection data schema 308, a table entry might describe a unique combination of: a connection resource identifier (e.g., stored in a "connectionID" field), a local access point identifier (e.g., stored in an "apLocalID" field), a remote access point identifier (e.g., stored in an "apRemoteID" field), an authentication token created and shared by the local access point (e.g., stored in an "apLocalToken" field), an authentication token created and shared by the remote access point (e.g., stored in an "apRemoteToken" field), and/or other attributes pertaining to the connection resource.

A set of entity data can also be organized and/or stored in data structures 3B00 (e.g., routing data structures). Such entity data might be organized and/or stored as entity objects, data tables, and/or other structures. When organized and/or stored in a tabular structure (e.g., relational database table), the entity data might have entries (e.g., rows) that relate various attributes pertaining to a particular entity in the multi-cluster computing environment. For example, and as depicted in entity data schema 310, a table entry might describe an entity identifier (e.g., "vm047" stored in an "entityID" field), an availability zone physical identifier (e.g., "azo3" stored in an "azPhysicalID" field), a cluster identifier for a cluster associated with the entity (e.g., stored in a "clusterID" field), a tenant identifier describing the owner of the entity (e.g., stored in a "tenantID" field), and/or other entity attributes.

As can be observed, the various data structures presented in FIG. 3B are related by shared attributes, fields, and/or parameters. Specifically, these data structures (e.g., routing data structures) can describe one or more relationships between an availability zone logical name, an availability zone physical identifier, a tenant identifier, a region identifier, an entity type, an entity identifier, a cluster identifier, a connection resource identifier, a request method, a processing capability, and/or other attributes, fields, and/or parameters. Certain representative instances of such relationships are illustrated in FIG. 3B.

For example, the "tenantID" and/or the "azLogicalName" from the request parameters 302 can used to determine the "azPhysicalID" (e.g., availability zone mapping 322). The attributes (e.g., availability zone attributes 306) of the "azPhysicalID" can be accessed to determine the "connectionID" associated with the "azPhysicalID" (e.g., connection resource mapping 324), which "connectionID" can be used to query the connection data to identify one or more connection resources to use when routing a resource management request. In some cases, an "entityType" from the request parameters 302 can be applied to the availability zone attributes 306 to select an availability zone (e.g., a particular "azPhysicalID") based on the processing capability at the availability zone (e.g., capabilities mapping 326). In other cases, an "entityID" from the request parameters 302 can be applied to the entity data to identify the availability zone (e.g., a particular "azPhysicalID") and/or cluster (e.g., a particular "clusterID") associated with the entity (e.g., entity mapping 328).

Figure 4A:
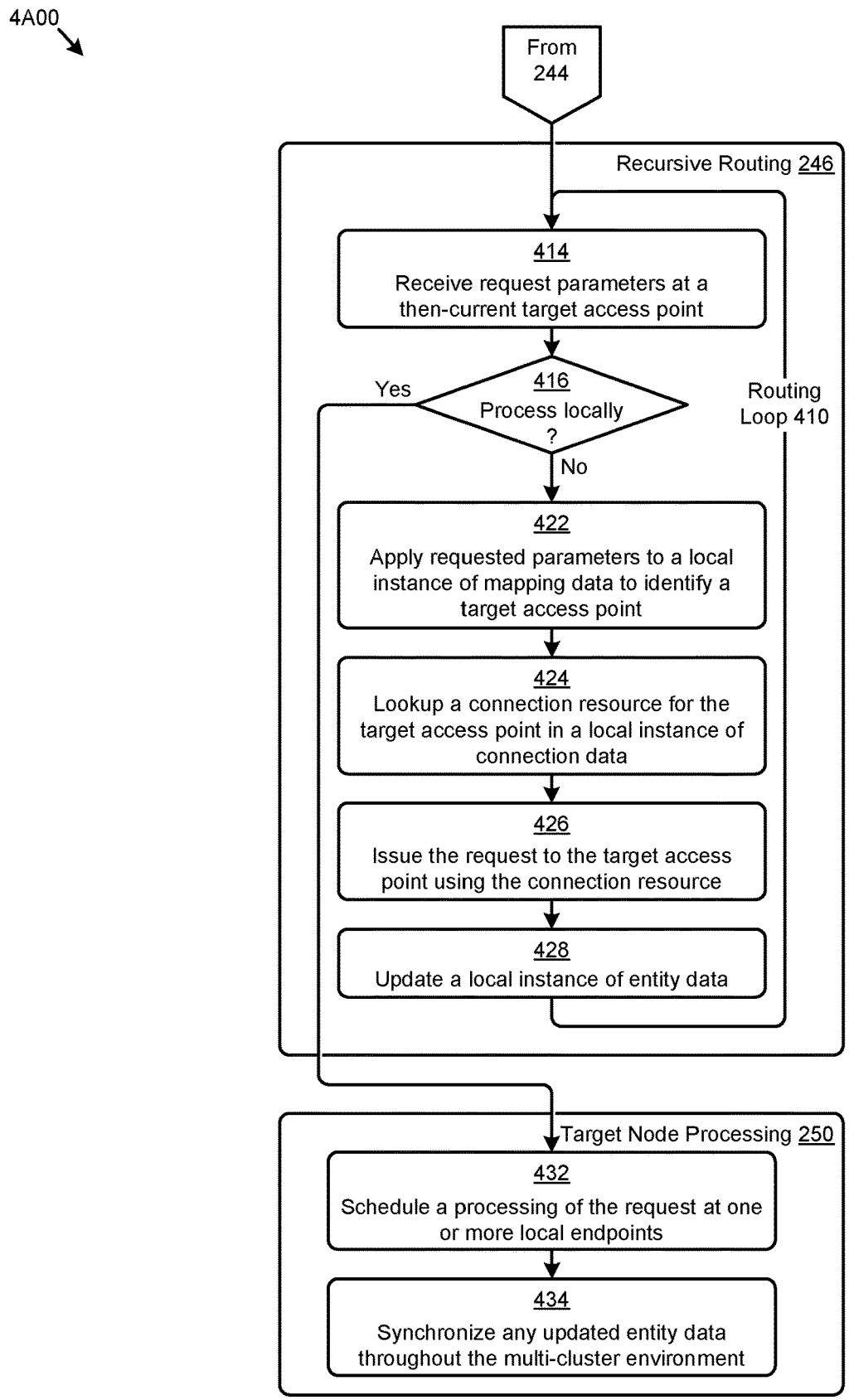
FIG. 4A exemplifies a request routing technique as implemented in systems that facilitate management of resources in multi-cluster computing environments, according to some embodiments.

Further details pertaining to routing requests to target access points (e.g., step 246 and step 250 of FIG. 2) is presented and discussed as pertains to FIG. 4A.

FIG. 4A exemplifies a request routing technique 4A00 as implemented in systems that facilitate management of resources in multi-cluster computing environments. As an option, one or more variations of request routing technique 4A00 or any aspect thereof may be implemented in the context of the architecture and functionality of the embodiments described herein. The request routing technique 4A00 or any aspect thereof may be implemented in any environment.

The request routing technique 4A00 presents one embodiment of certain steps and/or operations that facilitate routing of resource management requests over a multi-cluster computing environment. As can be observed, request routing technique 4A00 can commence by receiving a set of request parameters at a then-current target access point in the multi-cluster computing environment (step 414). As described herein, such request parameters might include information pertaining to a tenant, a request type, a target availability zone, and/or other parameters. In some cases, a request received at an access point might be forwarded to one or more other clusters for processing. If the request is not processed locally (see "No" path of decision 416), at least some of the request parameters are applied to a local instance of mapping data to identify a target access point to route the request (step 422). When there are multiple feasible target access points, a target access point might be selected based in part on an availability indicator (e.g., if the target access point is currently available to receive the request), a capability indicator (e.g., if the target access point is capable of receiving, forward, routing, or processing the resource management request), or one or more resource usage measurements (e.g., if the then-current loading of the target access point facilitates receiving the request).

When the target access point is determined, the connection resource corresponding to the target access point is discovered from a local instance of connection data (step 424). The request is then issued to the target access point using the connection resource (step 426). In some cases, a local instance of entity data is also updated (step 428). For example, when the resource management request calls for creation of a new entity (e.g., VM), the then-current target access point might generate a unique identifier for the new entity, and then store the identifier and related information (e.g., target availability zone, etc.) in a set of entity data.

In cases where the resource management request is routed or forwarded, the request routing technique 4A00 will repeat certain steps and/or operations (see routing loop 410) at the then-current target access point. At each routing loop, the then-current target access point will access data in a local instance of routing data structures to facilitate routing or processing of the request.

When the resource management request reaches an access point that can process the request (see "Yes" path of decision 416), the processing of the request is scheduled at one or more local endpoints (e.g., web service endpoints) by the then-current target access point (step 432). In certain embodiments, various data (e.g., entity data) that is created and/or updated in response to the routing and/or processing of resource management request is synchronized over the multi-cluster computing environment (step 434).

Figure 4B:
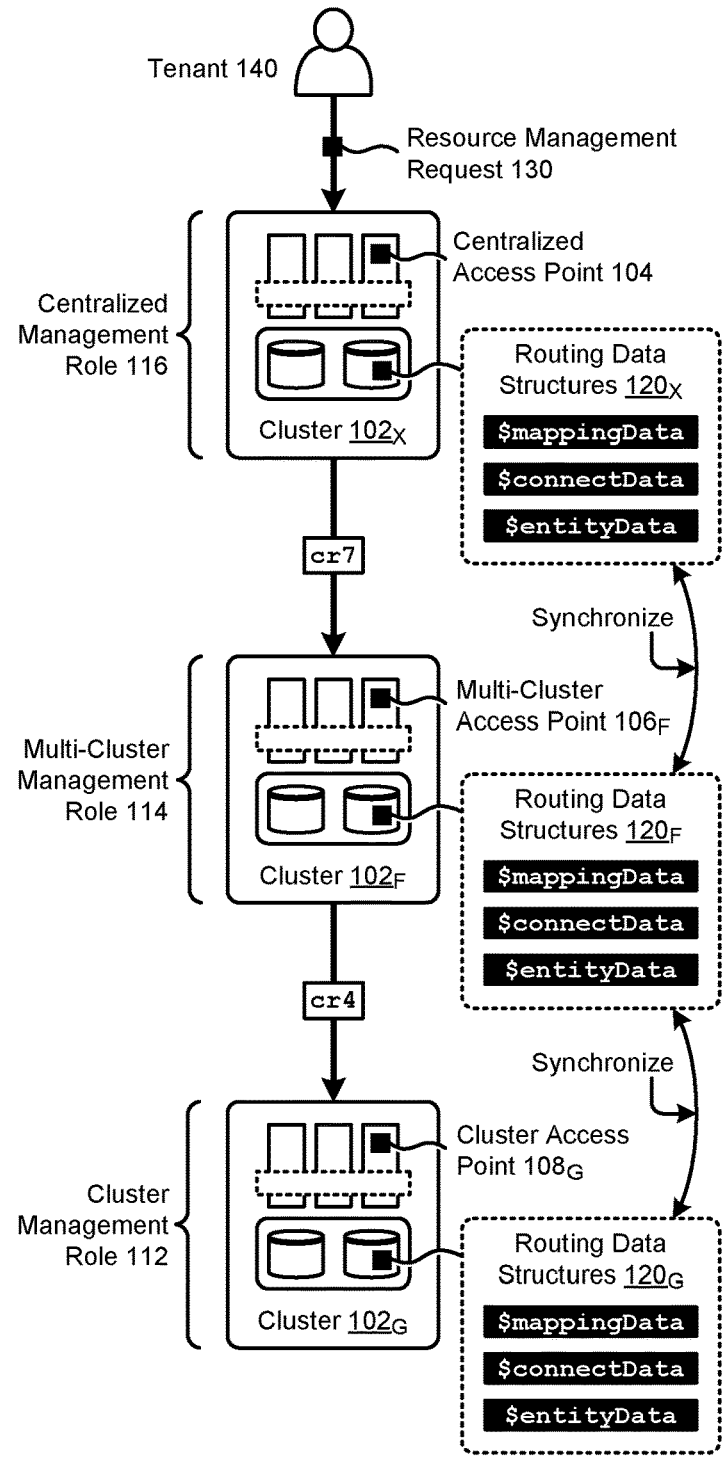
FIG. 4B presents a request routing scenario as implemented in systems that facilitate management of resources in multi-cluster computing environments, according to some embodiments.

An example scenario illustrating an implementation of request routing technique 4A00 is shown and described as pertains to FIG. 4B.

FIG. 4B presents a request routing scenario 4B00 as implemented in systems that facilitate management of resources in multi-cluster computing environments. As an option, one or more variations of request routing scenario 4B00 or any aspect thereof may be implemented in the context of the architecture and functionality of the embodiments described herein. The request routing scenario 4B00 or any aspect thereof may be implemented in any environment.

Request routing scenario 4B00 is merely one example representation of request routing as facilitated by the herein disclosed techniques. A representative set of clusters (e.g., cluster $102_X$ serving a centralized management role 116, cluster $102_F$ serving a multi-cluster management role 114, and cluster $102_G$ serving a cluster management role 112) are shown. The shown representative clusters, roles, and hierarchical arrangement are merely one example. Further details pertaining to the instances of routing data structures at each interconnected cluster (e.g., routing data structures $120_X$, routing data structures $120_F$, and routing data structures $120_G$) are also shown.

As can be observed, request routing scenario 4B00 can commence by receiving a resource management request 130 from tenant 140 at centralized access point 104 of cluster $102_X$. As described herein, the request can have request parameters that might characterize the tenant 140, a request type, a target availability zone, and/or other parameters. In most cases, a request received at a centralized access point (e.g., centralized access point 104) is destined to be forwarded to one or more other clusters for processing.

If the request is not processed locally, a set of mapping data (e.g., a "$mappingData" table) in routing data structures $120_X$ can be accessed by centralized access point 104 to map one or more of the request parameters to identify the multi-cluster access point $106_F$ at cluster $102_F$ as the target access point. When the target access point is determined, a set of connection data (e.g., a "$connectData" table) in routing data structures $120_X$ can be accessed by centralized access point 104 to lookup the connection resource (e.g., "cr7") corresponding to multi-cluster access point $106_F$. The request is then issued to the target access point (e.g., multi-cluster access point $106_F$) using the connection resource (e.g., "cr7"). In some cases, a local instance of entity data is also updated. For example, when the resource management request calls for the creation of a new entity (e.g., VM), centralized access point 104 might generate a unique identifier for the new entity, and then store the identifier and related information (e.g., target availability zone, etc.) in a set of entity data (e.g., a "$entityData" table) in routing data structures $120_X$.

As shown in the request routing scenario 4B00, a request might be forwarded multiple times. Specifically, centralized access point 104 might forward the resource management request 130 to multi-cluster access point $106_F$ and, in turn, multi-cluster access point $106_F$ might route the request to cluster access point $108_G$ at cluster $102_G$ (e.g., using connection resource "cr4"). At each routing loop, the then-current target access point will access data (e.g., "$mappingData", "$connectData", "$entityData", etc.) in a local instance of routing data structures to facilitate routing or processing of the request.

When the resource management request reaches an access point that can process the request, the processing of the request is scheduled at one or more local endpoints (e.g., web service endpoints) by the then-current target access point. In the shown scenario, cluster access point $108_G$ might schedule the request at an endpoint available to cluster $102_G$. In certain embodiments, various data (e.g., entity data) that are created and/or updated responsive to the routing and/or processing of resource management request are synchronized over the multi-cluster computing environment. For example, and as illustrated, certain data (e.g., in "$entityData") might be synchronized between routing data structures $120_G$, routing data structures $120_F$, and routing data structures $120_X$.

Various scenarios that use the routing data structures and/or other herein disclosed techniques to perform certain resource management requests are shown and described in FIG. 5A, FIG. 5B, FIG. 5C, and FIG. 5D.

FIG. 5A, FIG. 5B, FIG. 5C, and FIG. 5D present interaction diagrams 500 showing resource management request scenarios as implemented in systems that facilitate management of resources in multi-cluster computing environments. As an option, one or more variations of interaction diagrams 500 or any aspect thereof may be implemented in the context of the architecture and functionality of the embodiments described herein. The interaction diagrams 500 or any aspect thereof may be implemented in any environment.

Figure 5A:
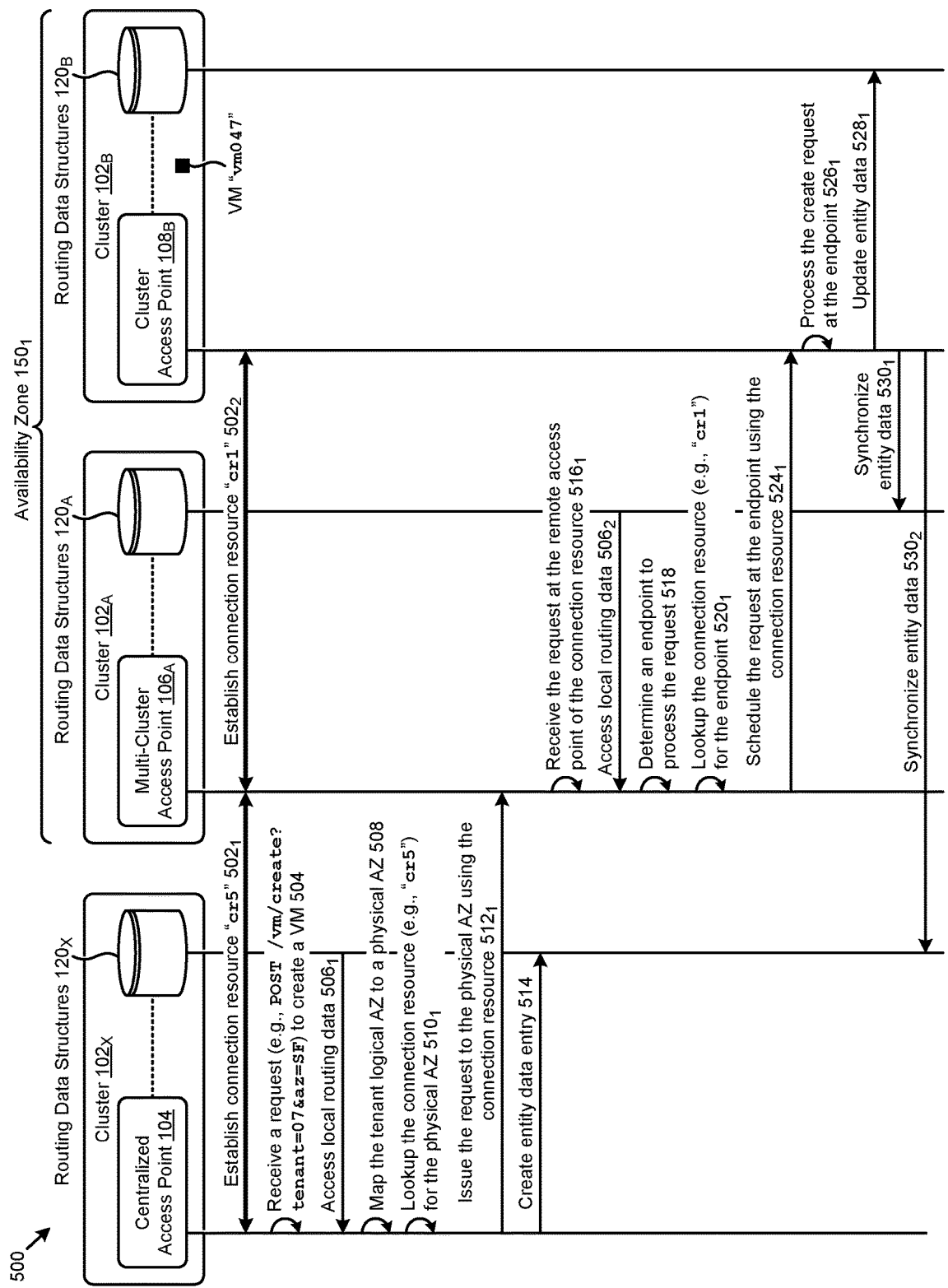
FIG. 5A, FIG. 5B, FIG. 5C, and FIG. 5D present interaction diagrams showing resource management request scenarios as implemented in systems that facilitate management of resources in multi-cluster computing environments, according to some embodiments.
Figure 5B:
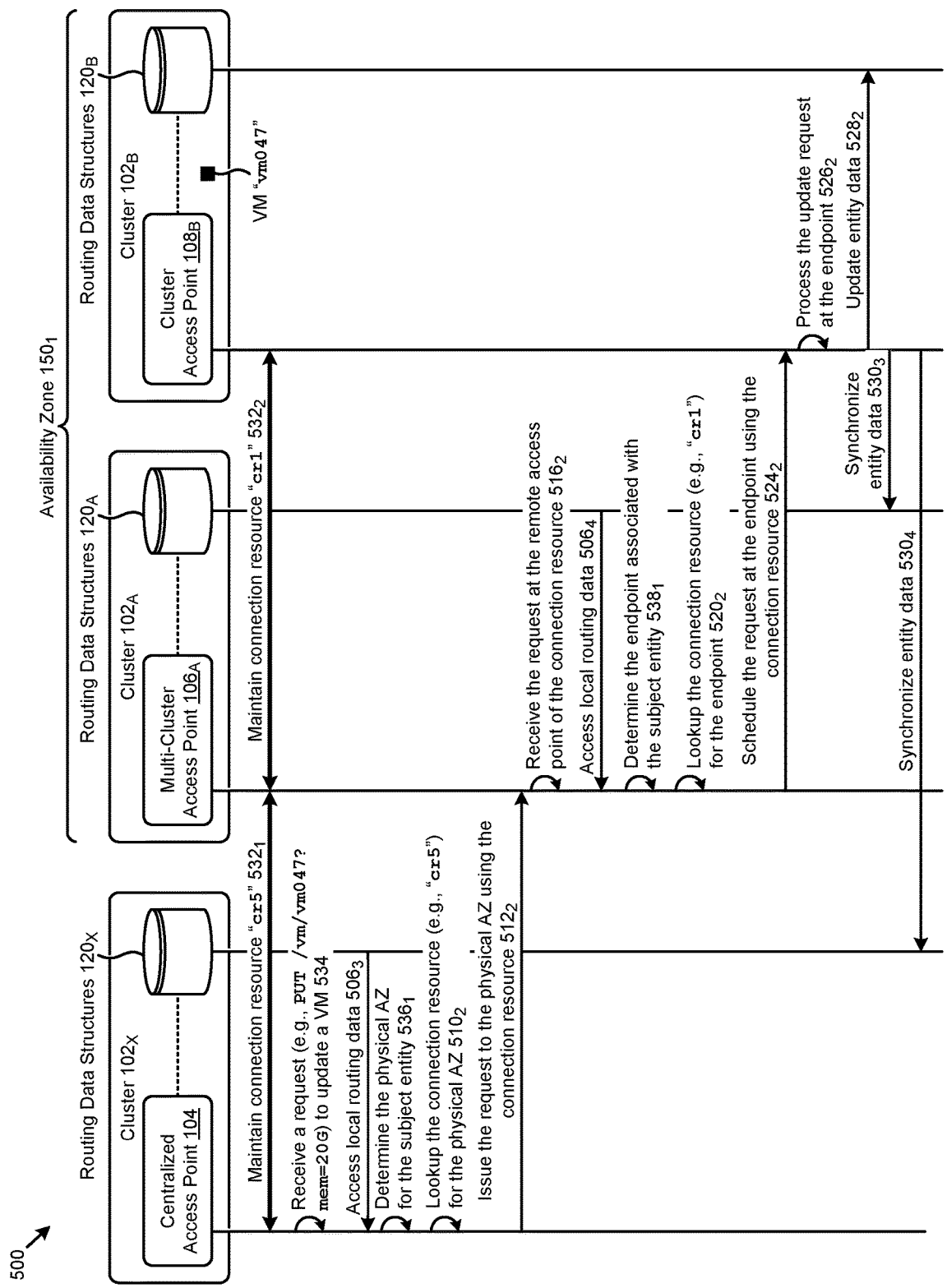
Figure 5C:
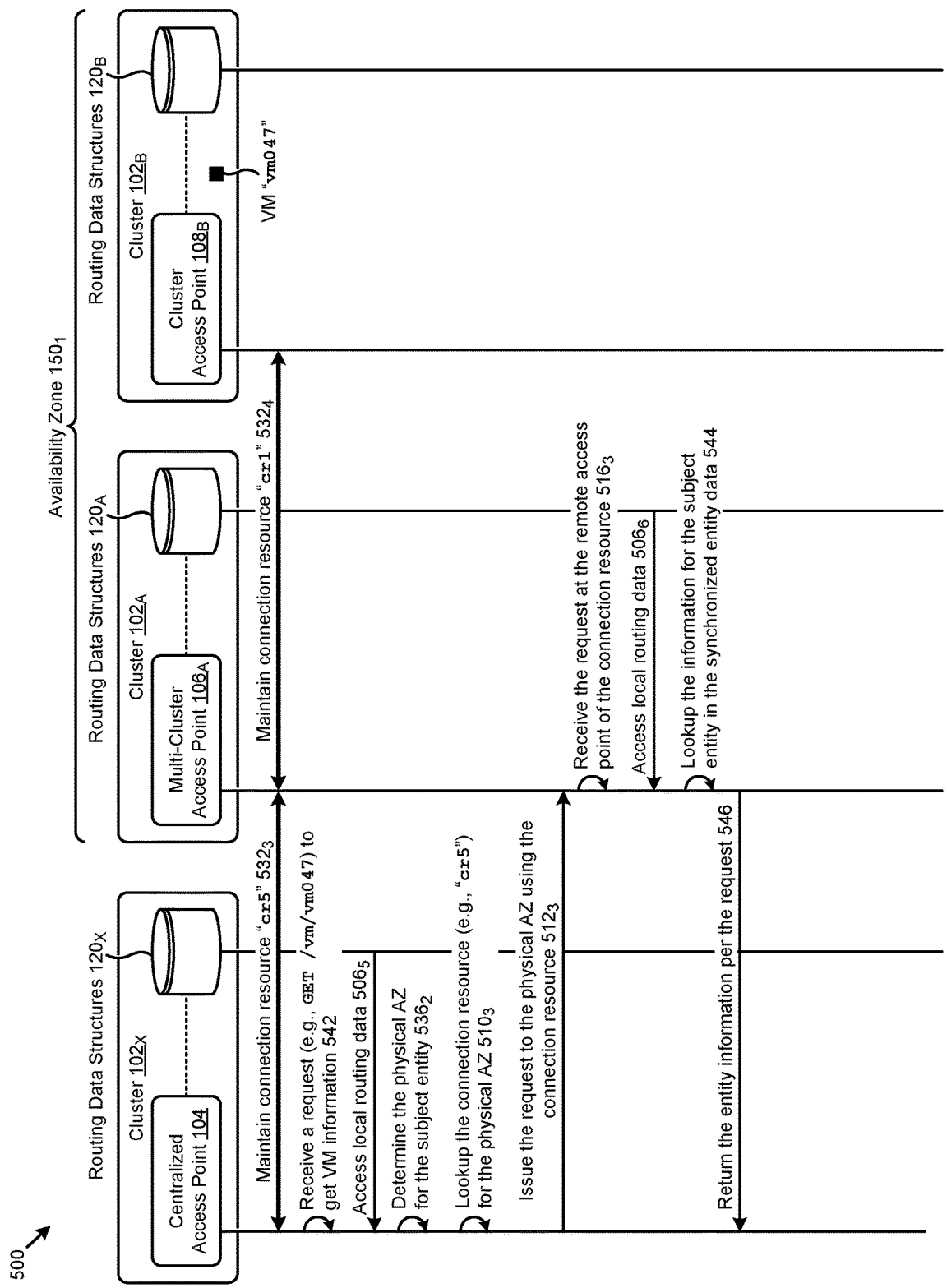

Interaction diagrams 500 presents representative instances of various system components earlier described that can exhibit a set of high order interactions (e.g., operations, messages, etc.) to facilitate the herein disclosed techniques. Specifically shown in FIG. 5A, FIG. 5B, and FIG. 5C are cluster $102_X$ comprising centralized access point 104 and routing data structures $120_X$, cluster $102_A$ comprising multi-cluster access point $106_A$ and routing data structures $120_A$, and cluster $102_B$ comprising cluster access point $108_B$ and routing data structures $120_B$. As indicated, cluster $102_A$ and cluster $102_B$ are part of the availability zone $150_1$.

Figure 5D:
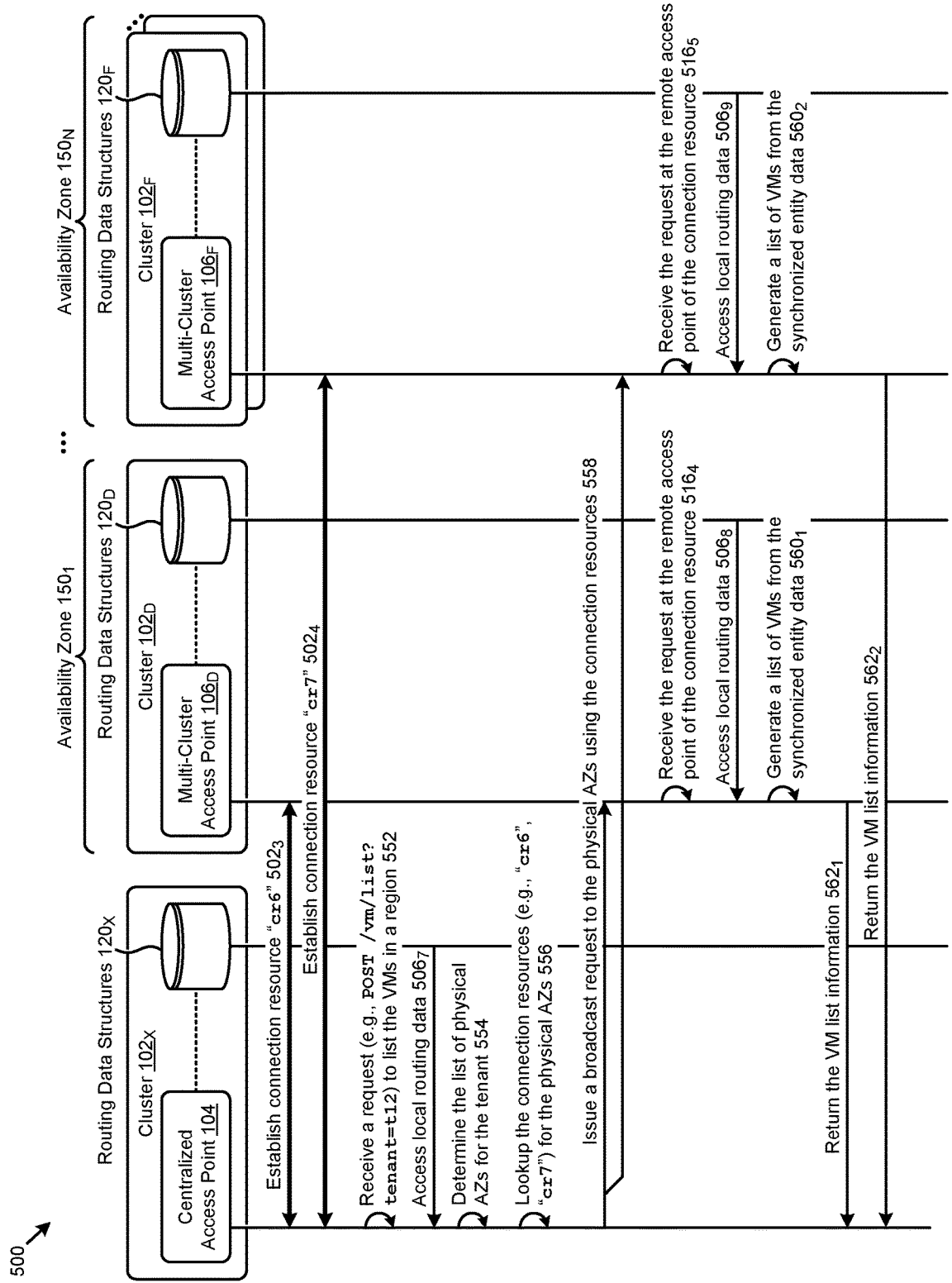

Shown in FIG. 5D are cluster $102_X$ comprising centralized access point 104 and routing data structures $120_X$, cluster $102_D$ comprising multi-cluster access point $106_D$ and routing data structures $120_D$, and cluster $102_F$ comprising multi-cluster access point $106_F$ and routing data structures $120_F$. As can be observed in FIG. 5D, cluster $102_D$ is from availability zone $150_2$ and cluster $102_F$ is from availability zone $150_3$.

Referring to the scenario depicted in FIG. 5A, at some moment in time, centralized access point 104 of cluster $102_X$ establishes a connection resource "cr5" with multi-cluster access point $106_A$ of cluster $102_A$ (message $502_1$) to carry out bi-directional communications between the access points. Also, multi-cluster access point $106_A$ of cluster $102_A$ establishes a connection resource "cr1" with cluster access point $108_B$ of cluster $102_B$ (message $502_2$) to carry out bi-directional communications between the access points. Such connection resources comprise a portion of the network of connection resources in the multi-cluster computing environment.

For the scenario depicted in FIG. 5A, a resource management request to create a VM is received at centralized access point 104 (operation 504). For example, the request might be structured as "POST/vm/create?tenant=07&az=SF". In this case, the request parameters might comprise "method=POST", "entityType=vm", "tenantID=07", and "azLogicalName=SF" (e.g., where "SF" abbreviates "San Francisco"). The local routing data (e.g., routing data structures $120_X$) are accessed (message $506_1$) to map the logical availability zone (e.g., "azLogicalName=SF") for the requesting tenant (e.g., "tenantID=07") to a physical availability zone (or "AZ") (operation 508). The connection resource associated with the identified physical AZ is determined from the connection data in the routing data structures (operation $510_1$). As an example, the identified physical availability zone might correspond to availability zone $150_1$ and the connection resource available to centralized access point 104 to reach that AZ is connection resource "cr5". The request is then issued to the physical AZ (e.g., availability zone $150_1$) using the connection resource (e.g., "cr5") (message $512_1$). In this case, an entry (e.g., "entityID=vm047") in the entity data comprising the routing data structures is created for the VM associated with the request (message 514).

The request routed from centralized access point 104 is received at the remote access point (e.g., multi-cluster access point $106_A$ of cluster $102_A$) (operation $516_1$). The local routing data (e.g., routing data structures $120_A$) are accessed (message $506_2$) to determine an endpoint to process the request (operation 518). In some cases, the endpoint and/or any target access point identified to receive a resource management request is selected based on various criteria, such as an availability indicator (e.g., whether or not the target access point is currently available to receive the request), a capability indicator (e.g., whether or not the target access point is capable of receiving, forwarding, routing, or processing the request), or one or more resource usage measurements (e.g., whether or not the then-current loading of the target access point facilitates receiving and/or processing the request). The connection resource associated with the identified endpoint is determined from the connection data in the routing data structures (operation $520_1$). As an example, the identified endpoint might correspond to cluster $102_B$ and the connection resource available to multi-cluster access point $106_A$ to reach that target cluster is connection resource "cr1".

The request is then scheduled at the endpoint using the connection resource (e.g., "cr1") (message $524_1$) and processed (e.g., in accordance with the resource schedule) at the endpoint (operation $526_1$). In this case, the entity data in the routing data structures is created and/or updated for the newly created VM (e.g., VM "vm047") (message $528_1$). Various portions (e.g., VM attributes, status, etc.) of the local entity data (e.g., in routing data structures $120_B$) are then synchronized to one or more other instances of routing data structures (e.g., routing data structures $120_A$, routing data structures $120_X$, etc.) in the multi-cluster computing environment (message $530_1$ and message $530_2$).

Referring to the scenario presented in FIG. 5B, the connection resources earlier established (e.g., in the scenario depicted in FIG. 5A) are continually maintained by the initiating access points (message $532_1$ and message $532_2$). A resource management request to update a VM is received at centralized access point 104 of cluster $102_X$ (operation 534). For example, the request might be structured as "PUT/vm/vm047?mem=20G". In this case, the request parameters might comprise "method=PUT", "entityType=vm", "entityID=vm047", and "mem=20G" (e.g., where "mem" represents a memory allocation size for the VM). The local routing data (e.g., routing data structures $120_X$) are accessed (message $506_3$) to determine the physical AZ for the subject entity (e.g., "entityID=vm047") (operation $536_1$). The connection resource associated with the identified physical AZ is determined from the connection data in the routing data structures (operation $510_2$).

As an example, the identified physical availability zone might correspond to availability zone $150_1$ (e.g., since "vm047" is at cluster $102_B$ in availability zone $150_1$) and the connection resource available to centralized access point 104 to reach that AZ is connection resource "cr5". The request is then issued to the physical AZ (e.g., availability zone $150_1$) using the connection resource (e.g., "cr5") (message $512_2$).

The request routed from centralized access point 104 is received at the remote access point (e.g., multi-cluster access point $106_A$ of cluster $102_A$) (operation $516_2$). The local routing data (e.g., routing data structures $120_A$) are accessed (message $506_4$) to determine an endpoint capable of managing the subject entity (operation $538_1$). The connection resource associated with the identified endpoint is determined from the connection data in the routing data structures (operation $520_2$). As an example, the identified endpoint might correspond to cluster $102_B$ and the connection resource available to multi-cluster access point $106_A$ to reach that target cluster is connection resource "cr1". The request is then scheduled at the endpoint using the connection resource (e.g., "cr1") (message $524_2$).

The request is then processed (e.g., in accordance with the resource schedule) at the endpoint (operation $526_2$). In this case, the entity data in the routing data structures is updated (e.g., corresponding to the "PUT") for the subject VM (message $528_2$). Various portions of the local entity data (e.g., in routing data structures $120_B$) are then synchronized to one or more other instances of routing data structures (e.g., routing data structures $120_A$, routing data structures $120_X$, etc.) in the multi-cluster computing environment (message $530_3$ and message $530_4$).

Referring to the scenario in FIG. 5C, the connection resources earlier established (e.g., in the scenario depicted in FIG. 5A) are continually maintained by the initiating access points (message $532_3$ and message $532_4$). A resource management request to get VM information is received at centralized access point 104 of cluster $102_X$ (operation 542). For example, the request might be structured as "GET/vm/vm047". In this case, the request parameters might comprise "method=GET", "entityType=vm", and "entityID=vm047". The local routing data (e.g., routing data structures $120_X$) are accessed (message $506_5$) to determine the physical AZ for the subject entity (e.g., "entityID=vm047") (operation $536_2$). The connection resource associated with the identified physical AZ is determined from the connection data in the routing data structures (operation $510_3$). As an example, the identified physical availability zone might correspond to availability zone $150_1$ (e.g., since "vm047" is at cluster $102_B$ in availability zone $150_1$) and the connection resource available to centralized access point 104 to reach that AZ is connection resource "cr5". The request is then issued to the physical AZ (e.g., availability zone $150_1$) using the connection resource (e.g., "cr5") (message $512_3$).

The request routed from centralized access point 104 is received at the remote access point (e.g., multi-cluster access point $106_A$ of cluster $102_A$) (operation $516_3$). The local routing data (e.g., routing data structures $120_A$) are accessed (message $506_6$) to facilitate processing of the request. In this case, certain entity data from the clusters in availability zone $150_1$ might be synchronized to the routing data structures $120_A$ available to multi-cluster access point $106_A$. In such cases, the requested information for the subject entity can be looked up (e.g., corresponding to the "GET") in the entity data synchronized to local storage (operation 544). The entity information (e.g., for VM "vm047") can then be returned (message 546).

Referring to the scenario depicted in FIG. 5D, at some moment in time, centralized access point 104 of cluster $102_X$ establishes a connection resource "cr6" with multi-cluster access point $106_D$ of cluster $102_D$ (message $502_3$). Centralized access point 104 also establishes a connection resource "cr7" with multi-cluster access point $106_F$ of cluster $102_F$ (message $502_4$). Such connection resources comprise a portion of the network of connection resources in the multi-cluster computing environment. A resource management request to list the VMs in a region is received at centralized access point 104 (operation 552). For example, the request might be a generic interface call such as "PUT/vm/list?tenant=12". In this case, the request parameters might comprise "method=PUT", "entityType=vm", and "tenantID=12". The local routing data (e.g., routing data structures $120_X$) are accessed (message $506_7$) to map the tenant identifier (e.g., "tenantID=12") to a list of physical availability zones in a region accessible by the tenant (operation 554). The connection resources associated with the list of physical AZs are determined from the connection data in the routing data structures (operation 556). As an example, the identified physical availability zones in the tenant's region might correspond to availability zone $150_2$ and availability zone $150_3$, and the connection resources available to centralized access point 104 to reach those AZs are connection resource "cr6" and connection resource "cr7". A broadcast request is then issued to the applicable physical AZs (e.g., availability zone $150_2$, availability zone $150_N$) using the applicable connection resources (e.g., "cr6" and "cr7") (message 558).

The request broadcast from centralized access point 104 is received at the remote access points (e.g., multi-cluster access point $106_D$ and multi-cluster access point $106_F$) (operation $516_4$ and operation $516_5$). The local routing data (e.g., routing data structures $120_D$ and routing data structures $120_F$) are accessed (message $506_8$ and message $506_9$) to facilitate processing of the request. In this case, each receiving access point can generate a respective list of VMs from the synchronized entity data stored in the local instances of routing data structures (operation $560_1$ and operation $560_2$). Each access point can then return the respective VM lists to the requestor at centralized access point 104 (message $562_1$ and message $562_2$).

The foregoing scenarios are merely examples of the use of the herein disclosed techniques to manage resources in multi-cluster computing environments, and other scenarios and uses are possible.

Figure 6:
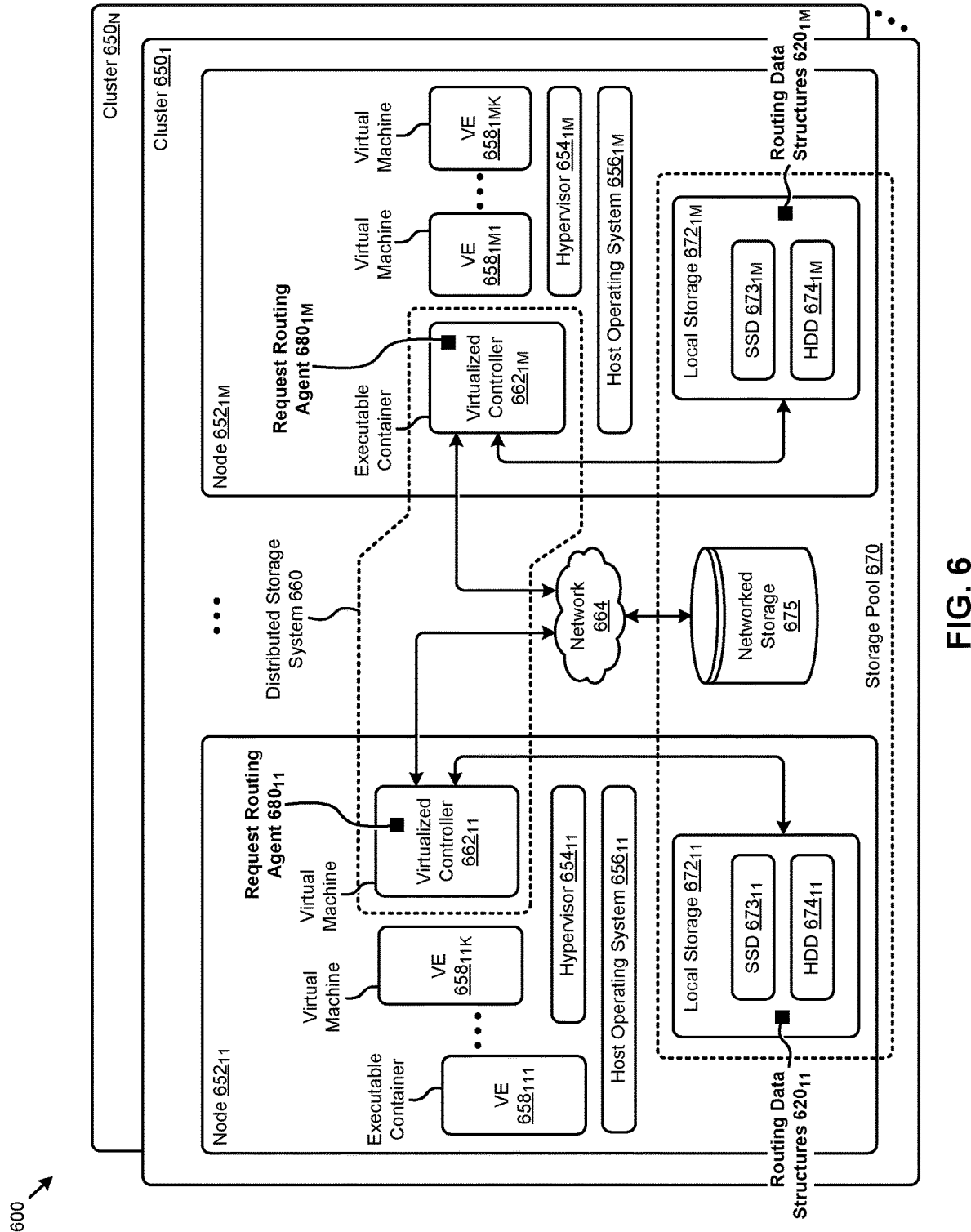
FIG. 6 presents a distributed virtualization environment for implementing systems that facilitate management of resources in multi-cluster computing environments, according to some embodiments.

An example of a distributed virtualization environment (e.g., multi-cluster distributed computing and storage environment, etc.) that supports any of the herein disclosed techniques is presented and discussed as pertains to FIG. 6.

FIG. 6 presents a distributed virtualization environment 600 for implementing systems that facilitate management of resources in multi-cluster computing environments. As an option, one or more variations of distributed virtualization environment 600 or any aspect thereof may be implemented in the context of the architecture and functionality of the embodiments described herein. The distributed virtualization environment 600 or any aspect thereof may be implemented in any environment.

The shown distributed virtualization environment depicts various components associated with one instance of a distributed virtualization system (e.g., hyperconverged distributed system) comprising a distributed storage system 660 that can be used to implement the herein disclosed techniques. Specifically, the distributed virtualization environment 600 comprises multiple clusters (e.g., cluster $650_1, \ldots,$ cluster $650_N$) comprising multiple nodes that have multiple tiers of storage in a storage pool. Representative nodes (e.g., node $652_{11}, \ldots,$ node $652_{1M}$) and storage pool 670 associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}, \ldots,$ local storage $672_{1M}$). For example, the local storage can be within or directly attached to a server and/or appliance associated with the nodes. Such local storage can include solid state drives (SSD $673_{11}, \ldots,$ SSD $673_{1M}$), hard disk drives (HDD $674_{11}, \ldots,$ HDD $674_{1M}$), and/or other storage devices.

As shown, the nodes in distributed virtualization environment 600 can implement one or more user virtualized entities (e.g., VE $658_{111}, \ldots,$ VE $658_{11K}, \ldots,$ VE $658_{1M1}, \ldots,$ VE $658_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}, \ldots,$ host operating system $656_{1M}$), while the VMs run multiple applications on various respective guest operating systems. Such flexibility can be facilitated at least in part by a hypervisor (e.g., hypervisor $654_{11}, \ldots,$ hypervisor $654_{1M}$), which hypervisor is logically located between the various guest operating systems of the VMs and the host operating system of the physical infrastructure (e.g., node).

As an example, hypervisors can be implemented using virtualization software that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}, \ldots,$ host operating system $656_{1M}$) without, in most cases, a hypervisor layer. This lightweight implementation can facilitate efficient distribution of certain software components, such as applications or services (e.g., micro-services). As shown, distributed virtualization environment 600 can implement both a hypervisor-assisted virtualization environment and a container virtualization environment for various purposes.

Distributed virtualization environment 600 also comprises at least one instance of a virtualized controller to facilitate access to storage pool 670 by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a layer in a hypervisor).

Multiple instances of such virtualized controllers can coordinate within a cluster to form the distributed storage system 660 which can, among other operations, manage the storage pool 670. This architecture further facilitates efficient scaling of the distributed virtualization system. The foregoing virtualized controllers can be implemented in distributed virtualization environment 600 using various techniques. Specifically, an instance of a virtual machine at a given node can be used as a virtualized controller in a hypervisor-assisted virtualization environment to manage storage and I/O (input/output or IO) activities. In this case, for example, the virtualized entities at node $652_{11}$ can interface with a controller virtual machine (e.g., virtualized controller $662_{11}$) through hypervisor $654_{11}$ to access the storage pool 670. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to a first vendor's software, and a hypervisor at another node in the distributed storage system 660 might correspond to a second vendor's software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool 670 by interfacing with a controller container (e.g., virtualized controller $662_{1M}$) through hypervisor $654_{1M}$ and/or the kernel of host operating system $656_{1M}$.

In certain embodiments, one or more instances of a request routing agent can be implemented in the distributed storage system 660 to facilitate the herein disclosed techniques. Specifically, request routing agent $680_{11}$ can be implemented in the virtualized controller $662_{11}$, and request routing agent $680_{1M}$ can be implemented in the virtualized controller $662_{1M}$. Such instances of the virtualized controller and/or its agents (e.g., request routing agent) can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., request routing agent). In some cases, a virtualized controller in a cluster is selected (e.g., elected as leader) to serve as an access point for the cluster. In such cases, the instance of the request routing agent associated with the selected virtualized controller might be activated while other instances of the request routing agent in the cluster might be deactivated. Various instances of routing data structures (e.g., routing data structures $620_{11}$ and routing data structures $620_{1M}$) might be distributed across the cluster to facilitate reliable accessibility (e.g., fault tolerance) by the instances of the request routing agent to carry out the herein disclosed techniques.

Additional Embodiments of the Disclosure

Additional Practical Application Examples

Figure 7:
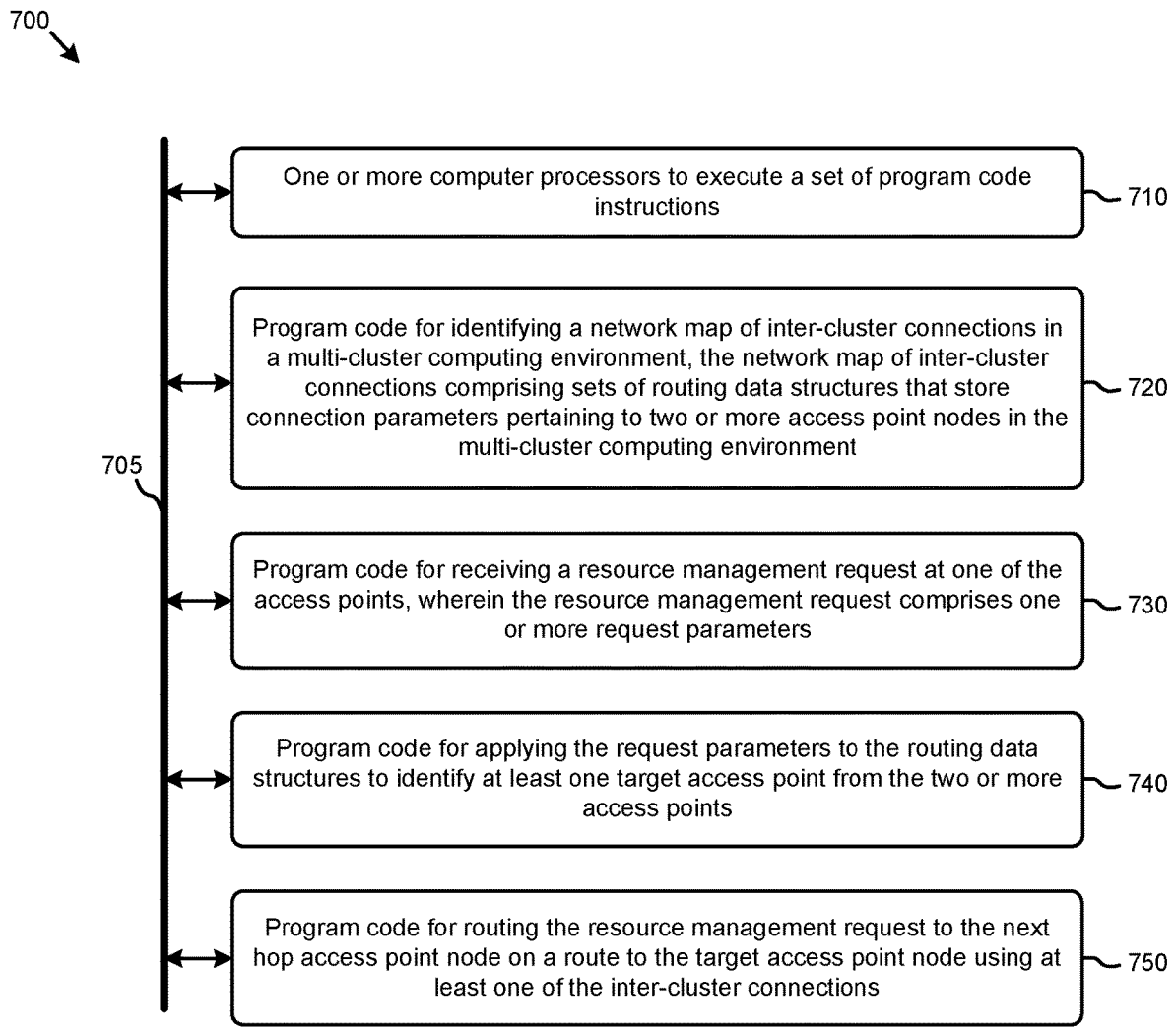
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that facilitate efficient management of resources from a centralized access point in a highly dynamic multi-cluster computing environment. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying a network map of inter-cluster connections in a multi-cluster computing environment, the network map of inter-cluster connections comprising inter-cluster connection identifiers and corresponding sets of routing data structures that store connection parameters pertaining to two or more instances of access point nodes in the multi-cluster computing environment (module 720); receiving a resource management request at one of the access points, wherein the resource management request comprises one or more request parameters (module 730); applying the request parameters to the routing data structures to identify at least one target access point from the two or more access points (module 740); and routing the resource management request to the next hop access point node on a route to the target access point node using at least one of the inter-cluster connections (module 750). The foregoing techniques serve to maintain a network map of inter-cluster connections across multiple clusters where any individual cluster of the multiple clusters maintains only a subset of the network map. The subset of the network map includes routing data to access next hop access points (e.g., to a hierarchically higher neighboring cluster or to a hierarchically lower neighboring cluster). This smaller subset is maintained by each individual cluster rather than having any cluster maintain a complete record of all of the inter-cluster connections at any individual cluster.

Variations of the foregoing may include more or fewer of the shown modules. Certain variations may perform more or fewer (or different) steps, and/or certain variations may use data elements in more, or in fewer (or different) operations. Still further, some embodiments include variations in the operations performed, and some embodiments include variations of aspects of the data elements used in the operations.

System Architecture Overview

Additional System Architecture Examples

Figure 8A:
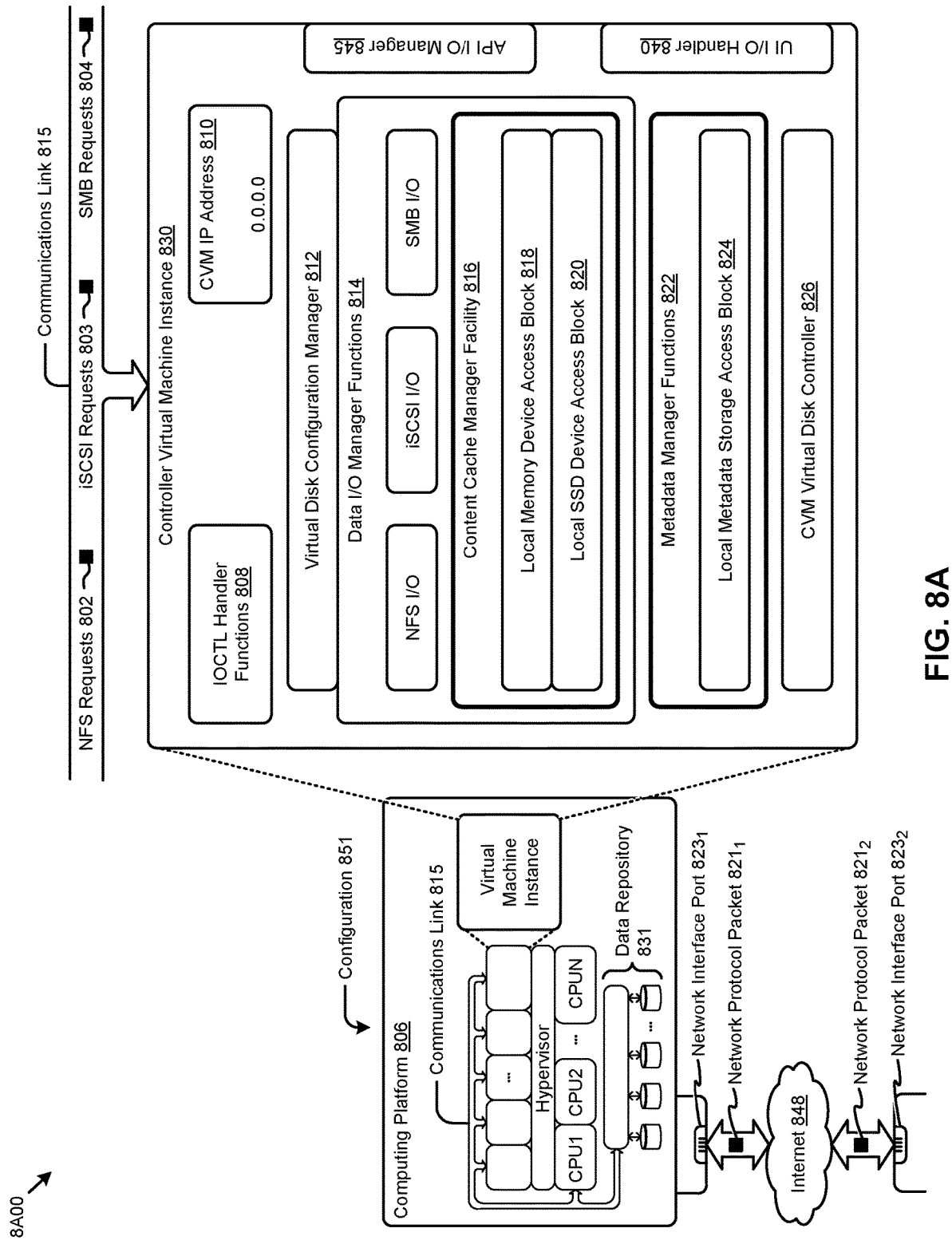
FIG. 8A, FIG. 8B and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high-performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, ..., CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port 8231 and network interface port 8232). Configuration 851 can be addressed through one or more network interface ports using an IP address. Any operational element within computing platform 806 can perform sending and receiving operations using any of a range of network protocols, possibly including network protocols that send and receive packets (e.g., network protocol packet 8211 and network protocol packet 8212).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to management of resources in multi-cluster computing environments. In some embodiments, a module may include one or more state machines and/or combinational logic used to implement or facilitate the operational and/or performance characteristics pertaining to management of resources in multi-cluster computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing resources in multi-cluster computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to management of resources in multi-cluster computing environments, and/or for improving the way data is manipulated when performing computerized operations pertaining to implementing a communication and processing regime to route resource management requests through a network of computing cluster access points.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
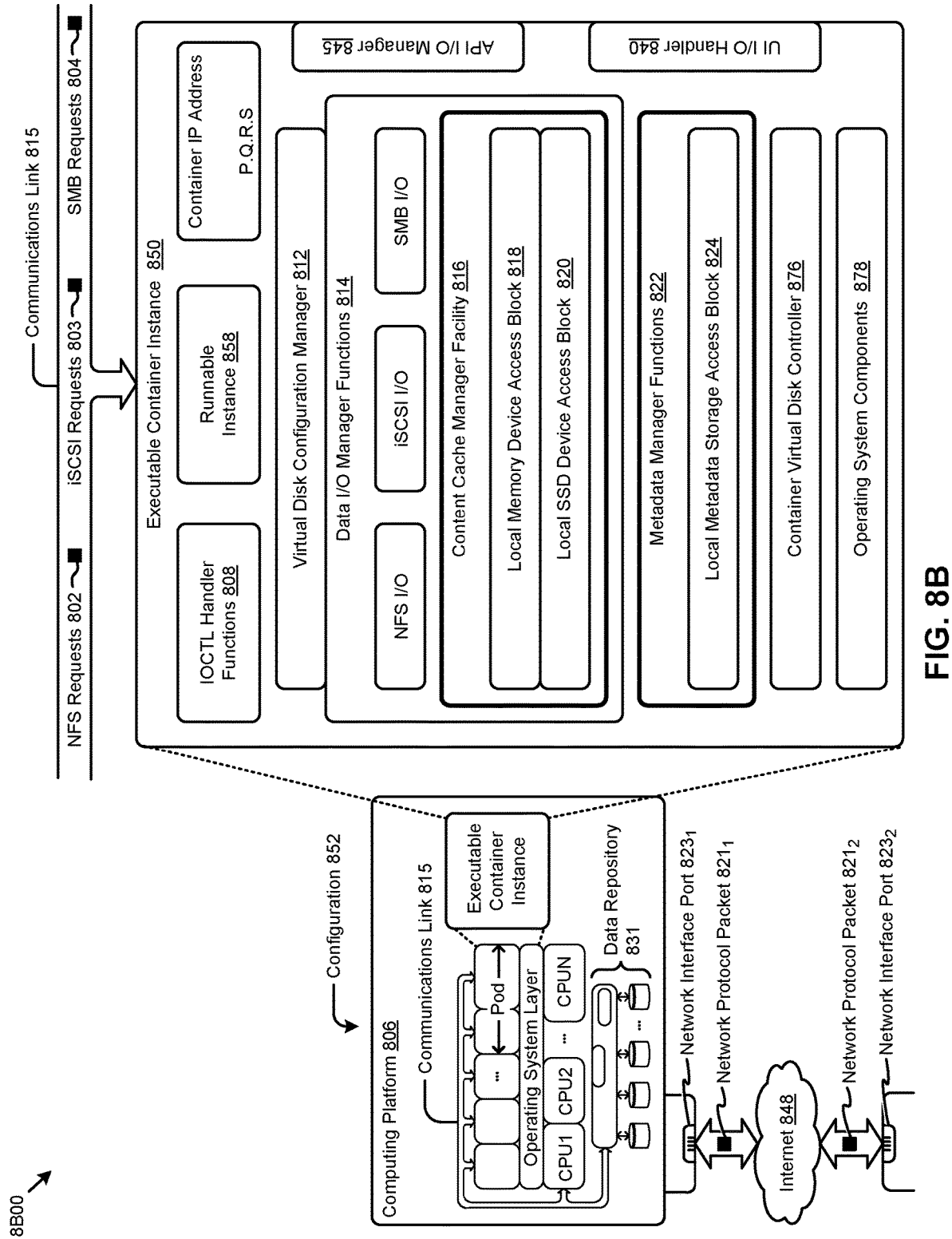

FIG. 8B depicts a virtualized controller implemented by containerized architecture 8B00. The containerized architecture comprises a collection of interconnected components suitable for implementing embodiments of the present disclosure and/or for use in the herein-described environments.

Moreover, the shown containerized architecture 8B00 includes an executable container instance in configuration 852 that is further described as pertaining to the executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls -a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
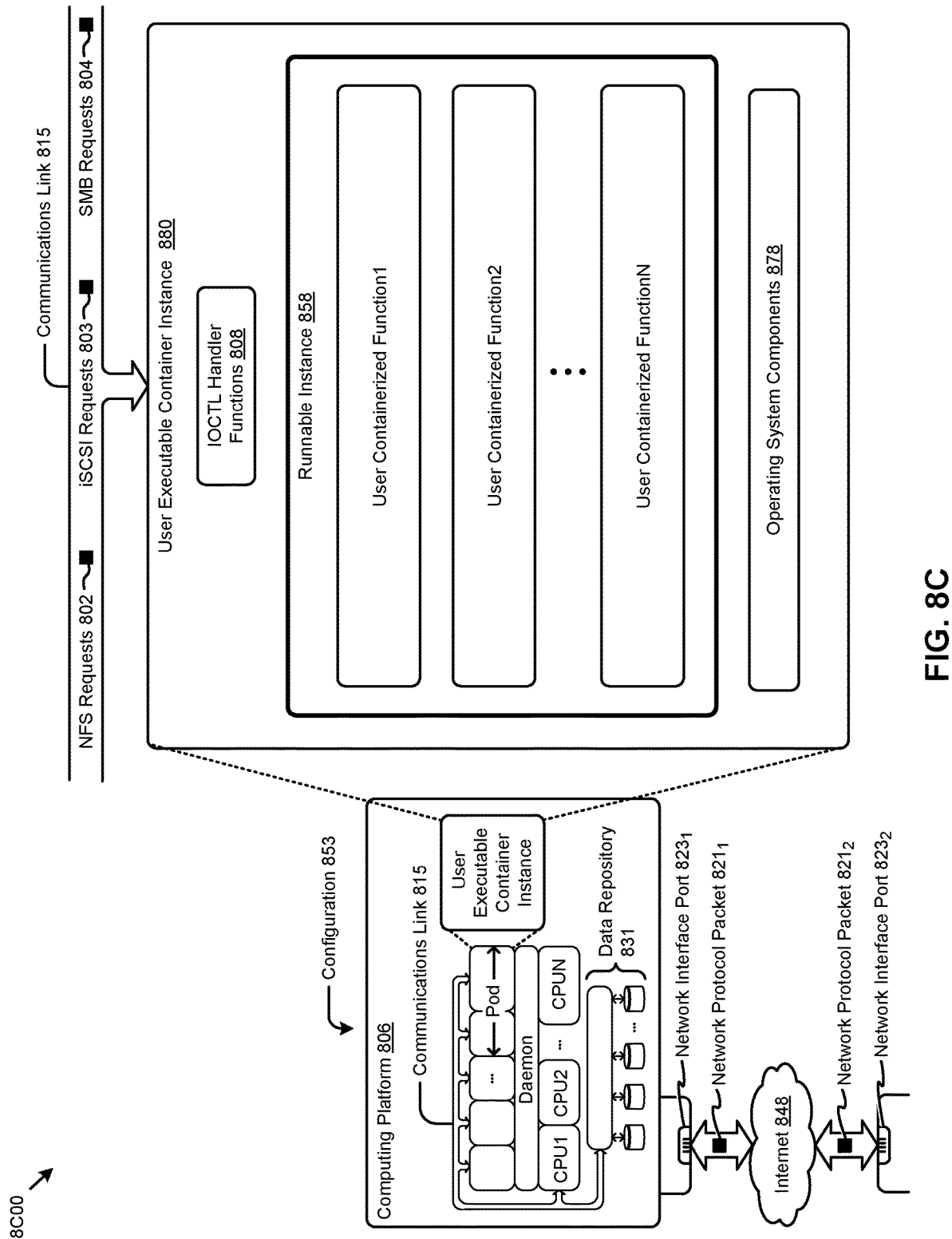

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture of FIG. 8C can be used in any combination to implement a distributed platform that contains multiple servers and/or nodes that manage multiple tiers of storage, where the tiers of storage might be formed using the shown external data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or a node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including locally attached storage, networked storage, and cloud storage. In example embodiments, the storage controllers run as special virtual machines-above the hypervisors-thus, the approach of using such special virtual machines can be used and implemented within any virtual machine architecture. Furthermore, the storage controllers can be used in conjunction with any hypervisor from any virtualization vendor and/or implemented using any combination or variation of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for virtual entity resource management in a multi-cluster environment, the method comprising:
   maintaining a network map of inter-cluster connections across multiple clusters, wherein an individual cluster of the multiple clusters maintains only a subset of the network map, and wherein the network map comprises routing data that refers to next hop access points;
   receiving a resource management request at an access point, wherein the resource management request comprises a request parameter pertaining to a virtual machine at a cluster of the multiple clusters, and the virtual machine is associated with a target access point;
   applying the request parameter to routing data at the access point to identify a next hop access point;
   routing the resource management request to the next hop access point on a route to the target access point;
   receiving the resource management request at the next hop access point and accessing routing data at the next hop access point to identify a further next hop on the route to the target access point; and
   synchronizing at least a portion of the routing data with at least one interconnected cluster.

2. The method of claim 1, wherein the target access point is selected based at least in part on, a virtual machine identifier, an availability indicator, a capability indicator, or a resource usage measurement.

3. The method of claim 1, wherein the next hop access point is determined based at least in part on inter-cluster connections of the network map.

4. The method of claim 1, further comprising receiving the resource management request at the target access point and transmitting at least one result of processing the resource management request.

5. The method of claim 1, wherein the routing data comprises at least one of, a set of connection data, a set of mapping data, or a set of entity data.

6. The method of claim 1, wherein the routing data comprises a relationship between at least one of, an availability zone logical name, an availability zone physical identifier, a tenant identifier, a region identifier, an entity type, an entity identifier, a cluster identifier, an inter-cluster connection identifier, a request method, or a processing capability.

7. A non-transitory computer readable medium having stored thereon a sequence of instructions which, when executed by a processor causes a set of acts for virtual entity resource management in a multi-cluster environment, the set of acts comprising:
   maintaining a network map of inter-cluster connections across multiple clusters, wherein an individual cluster of the multiple clusters maintains only a subset of the network map, and wherein the network map comprises routing data that refers to next hop access points;
   receiving a resource management request at an access point, wherein the resource management request comprises a request parameter pertaining to a virtual machine at a cluster of the multiple clusters, and the virtual machine is associated with a target access point;
   applying the request parameter to routing data at the access point to identify a next hop access point;
   routing the resource management request to the next hop access point on a route to the target access point;
   receiving the resource management request at the next hop access point and accessing routing data at the next hop access point to identify a further next hop on the route to the target access point; and
   synchronizing at least a portion of the routing data with at least one interconnected cluster.

8. The non-transitory computer readable medium of claim 7, wherein the target access point is selected based at least in part on, a virtual machine identifier, an availability indicator, a capability indicator, or a resource usage measurement.

9. The non-transitory computer readable medium of claim 7, wherein the next hop access point is determined based at least in part on inter-cluster connections of the network map.

10. The non-transitory computer readable medium of claim 7, wherein the set of acts further comprise receiving the resource management request at the target access point and transmitting at least one result of processing the resource management request.

11. The non-transitory computer readable medium of claim 7, wherein the routing data comprises at least one of, a set of connection data, a set of mapping data, or a set of entity data.

12. The non-transitory computer readable medium of claim 7, wherein the routing data comprises a relationship between at least one of, an availability zone logical name, an availability zone physical identifier, a tenant identifier, a region identifier, an entity type, an entity identifier, a cluster identifier, an inter-cluster connection identifier, a request method, or a processing capability.

13. A system for virtual entity resource management in a multi-cluster environment, the system comprising:
 a storage medium having stored thereon a sequence of instructions; and
 a processor that executes the sequence of instructions to cause the processor to perform a set of acts, the set of acts comprising:
  maintaining a network map of inter-cluster connections across multiple clusters, wherein an individual cluster of the multiple clusters maintains only a subset of the network map, and wherein the network map corresponds to comprises routing data that refers to next hop access points;
  receiving a resource management request at an access point, wherein the resource management request comprises a request parameter pertaining to a virtual machine at a cluster of the multiple clusters, and the virtual machine is associated with a target access point;
  applying the request parameter to routing data at the access point to identify a next hop access point;
  routing the resource management request to the next hop access point on a route to the target access point;
  receiving the resource management request at the next hop access point and accessing routing data at the next hop access point to identify a further next hop on the route to the target access point; and
  synchronizing at least a portion of the routing data with at least one interconnected cluster.

14. The system of claim 13, wherein the target access point is selected based at least in part on, a virtual machine identifier, an availability indicator, a capability indicator, or a resource usage measurement.

15. The system of claim 13, wherein the next hop access point is determined based at least in part on inter-cluster connections of the network map.

16. The system of claim 13, wherein the set of acts further comprise receiving the resource management request at the target access point and transmitting at least one result of processing the resource management request.

17. The system of claim 13, wherein the routing data comprises at least one of, a set of connection data, a set of mapping data, or a set of entity data.

18. The system of claim 13, wherein the routing data comprises a relationship between at least one of, an availability zone logical name, an availability zone physical identifier, a tenant identifier, a region identifier, an entity type, an entity identifier, a cluster identifier, an inter-cluster connection identifier, a request method, or a processing capability.

* * * * *